United States Patent
Felix

(10) Patent No.: US 10,532,888 B2
(45) Date of Patent: Jan. 14, 2020

(54) COVERING APPLIANCE WITH A CONVEYING MEMBER

(71) Applicant: WRH Walter Reist Holding AG, Ermatingen (CH)

(72) Inventor: Markus Felix, Richterswil (CH)

(73) Assignee: WRH WALTER REIST HOLDING AG, Ermatingen (CH)

( * ) Notice: Subject to any disclaimer, the term of this patent is extended or adjusted under 35 U.S.C. 154(b) by 0 days.

(21) Appl. No.: 16/096,433

(22) PCT Filed: Apr. 26, 2017

(86) PCT No.: PCT/CH2017/000038
§ 371 (c)(1),
(2) Date: Oct. 25, 2018

(87) PCT Pub. No.: WO2017/185192
PCT Pub. Date: Nov. 2, 2017

(65) Prior Publication Data
US 2019/0135545 A1    May 9, 2019

(30) Foreign Application Priority Data
Apr. 28, 2016 (CH) .......................... 567/16

(51) Int. Cl.
*B65G 17/24*   (2006.01)
*B65G 23/16*   (2006.01)
(Continued)

(52) U.S. Cl.
CPC ............ *B65G 17/24* (2013.01); *B65G 15/12* (2013.01); *B65G 15/42* (2013.01); *B65G 17/34* (2013.01); *B65G 23/16* (2013.01); *B65G 39/20* (2013.01)

(58) Field of Classification Search
CPC ...... B65G 15/12; B65G 15/42; B65G 17/065; B65G 17/24; B65G 17/30; B65G 17/32; (Continued)

(56) References Cited

U.S. PATENT DOCUMENTS 3,209,973 A    10/1965   Eichorn
3,901,376 A *  8/1975   Dardaine ................ B65B 43/52
                                                 53/247
(Continued)

FOREIGN PATENT DOCUMENTS

DE    6918651       9/1969
DE    24 16 089     1/1975
(Continued)

OTHER PUBLICATIONS

Switzerland Search Report dated Oct. 6, 2016, Application No. 00567/16, 3 pages.

*Primary Examiner* — Gene O Crawford
*Assistant Examiner* — Keith R Campbell
(74) *Attorney, Agent, or Firm* — Rankin, Hill & Clark LLP

(57) ABSTRACT

A conveying appliance with a conveying member that is movable along a conveying stretch and forms a conveying surface for an item that is to be conveyed, wherein the conveying surface of the conveying member includes openings. An active device has at least one active element that is movable along a closed circulating path, wherein in an active section of the conveying stretch, the circulating path forms an actively effective path section that runs parallel to the conveying member. The active device interacts with the conveying member in the active section in a manner such that the at least one active element along the actively effective path section projects through an opening through the conveying member and projects beyond the conveying surface, in a manner such that the at least one active element (Continued)

is capable of mechanically acting upon a conveyed item which lies on the conveying surface.

32 Claims, 12 Drawing Sheets

(51) Int. Cl.
  *B65G 15/42* (2006.01)
  *B65G 15/12* (2006.01)
  *B65G 17/34* (2006.01)
  *B65G 39/20* (2006.01)
(58) Field of Classification Search
  CPC ........ B65G 17/34; B65G 17/46; B65G 23/16; B65G 39/025; B65G 39/20; B65G 47/261; B65G 47/268; B65G 47/28; B65G 47/54; B65G 47/945; B65G 47/96; B65G 47/962; B65G 47/964; B65G 47/965
  See application file for complete search history.

(56) References Cited

U.S. PATENT DOCUMENTS

| | | | |
|---|---|---|---|
| 4,040,512 A * | 8/1977 | Ness | B65G 47/28 198/460.1 |
| 5,004,094 A * | 4/1991 | Brandt | B65G 43/08 198/460.1 |
| 5,081,360 A * | 1/1992 | Oshida | B29C 71/04 198/384 |
| 5,570,773 A * | 11/1996 | Bonnet | B65G 17/345 198/370.04 |
| 6,079,542 A | 6/2000 | Blood | |
| 6,318,544 B1 * | 11/2001 | O'Connor | B65G 17/24 198/779 |
| 6,374,983 B1 | 4/2002 | Morigi | |
| 6,571,937 B1 | 6/2003 | Costanzo et al. | |
| 6,595,349 B2 * | 7/2003 | MacSwan | B65G 47/54 198/370.09 |
| 7,188,721 B1 * | 3/2007 | Wu | B65G 47/244 193/35 MD |
| 7,311,191 B2 * | 12/2007 | Bahr | B65G 47/2445 198/396 |
| 8,544,634 B2 * | 10/2013 | Fourney | B65G 47/29 198/779 |
| 8,714,365 B2 * | 5/2014 | Morley | B07C 5/36 209/606 |
| 9,254,962 B2 * | 2/2016 | Studer | B65G 17/066 |
| 9,567,164 B2 * | 2/2017 | Kirkpatrick, Jr. | B65G 23/16 |
| 9,902,568 B2 * | 2/2018 | Lee | B65G 47/53 |
| 2004/0226803 A1 * | 11/2004 | Brixius | B65G 47/53 198/370.1 |
| 2018/0155134 A1 * | 6/2018 | Heuft | B65G 21/10 |

FOREIGN PATENT DOCUMENTS

| | | |
|---|---|---|
| DE | 689 02 402 | 2/1993 |
| DE | 690 05 146 | 4/1994 |
| DE | 695 06 355 | 7/1999 |
| DE | 695 20 692 | 11/2001 |
| DE | 103 15 403 | 10/2004 |
| EP | 1 182 152 | 2/2002 |
| EP | 1 398 282 | 3/2004 |
| WO | 01/32533 | 5/2001 |
| WO | 2010/083567 | 7/2010 |
| WO | 2011/087937 | 7/2011 |
| WO | 2012/068699 | 5/2012 |
| WO | 2013/131141 | 9/2013 |
| WO | 2016/167907 | 10/2016 |

* cited by examiner

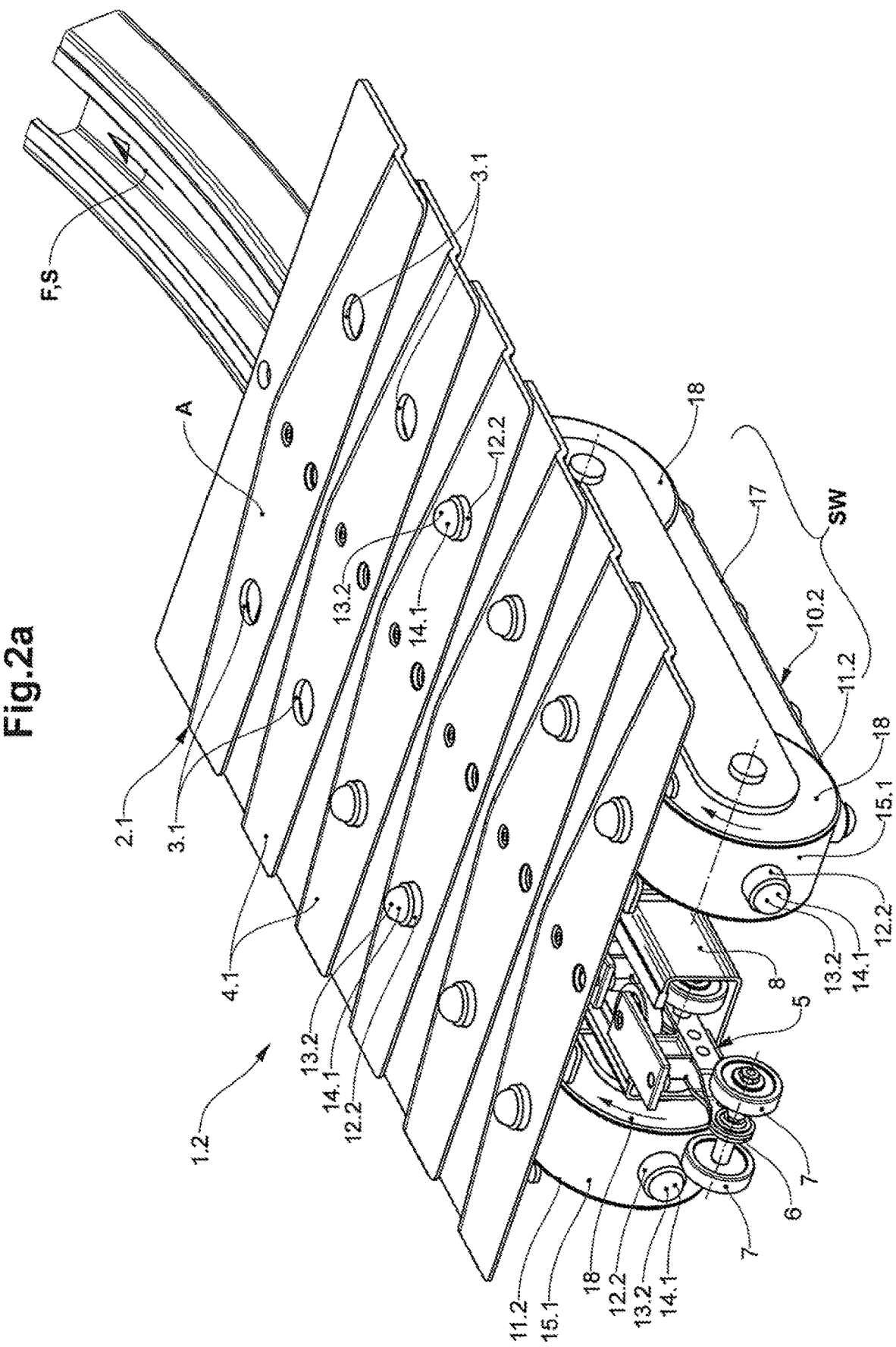

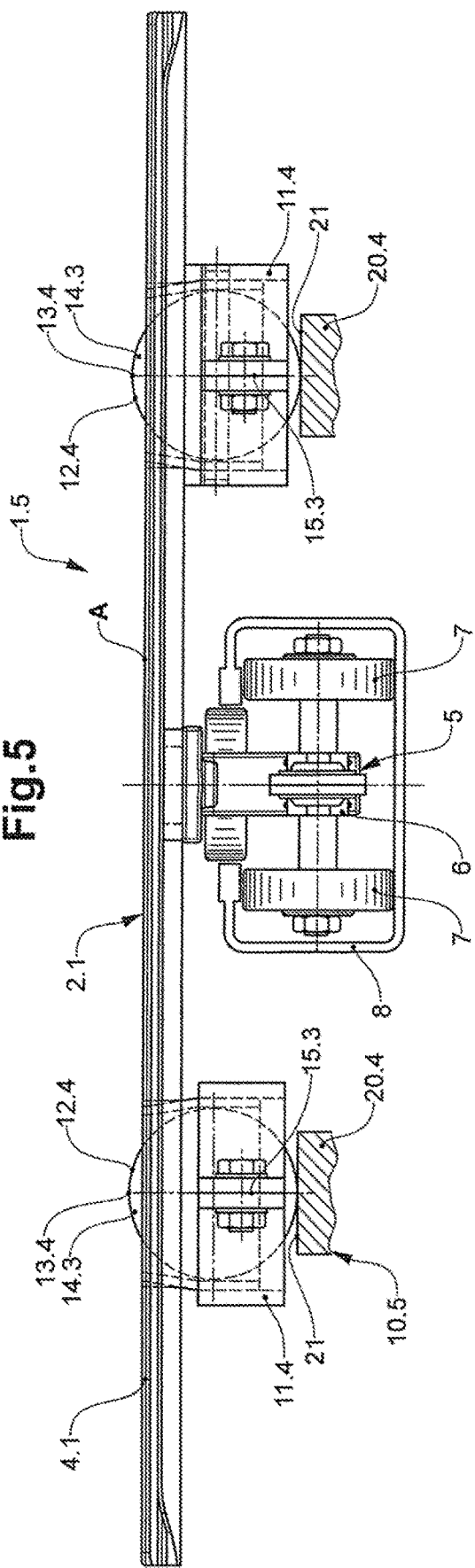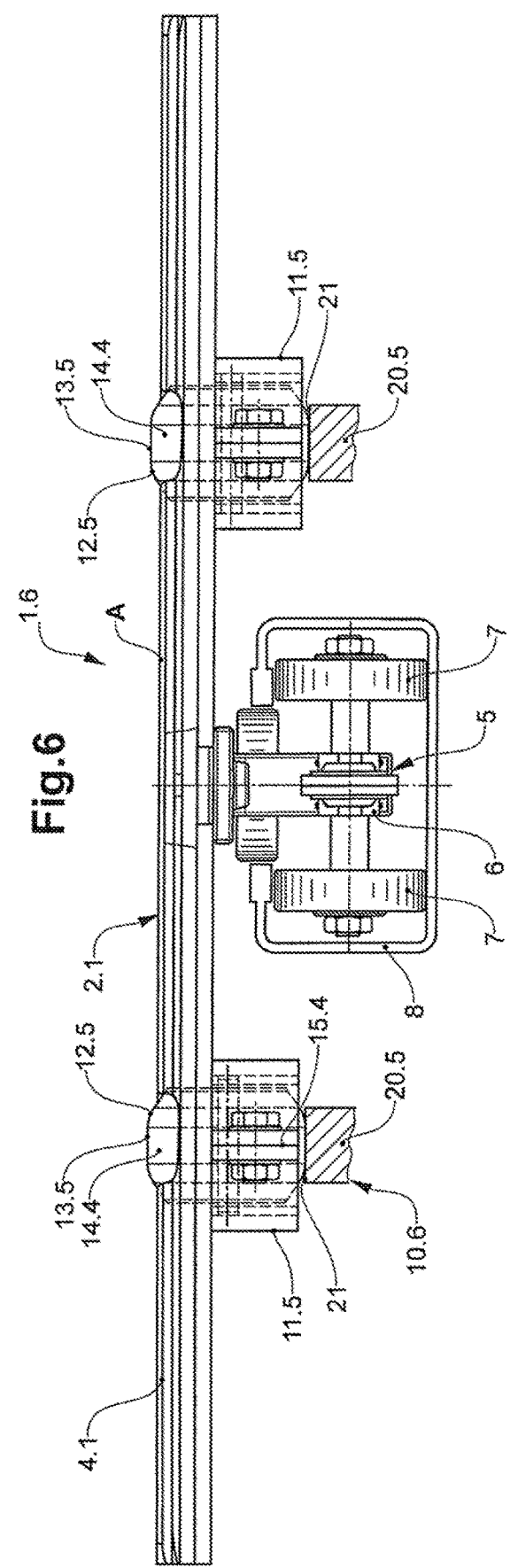

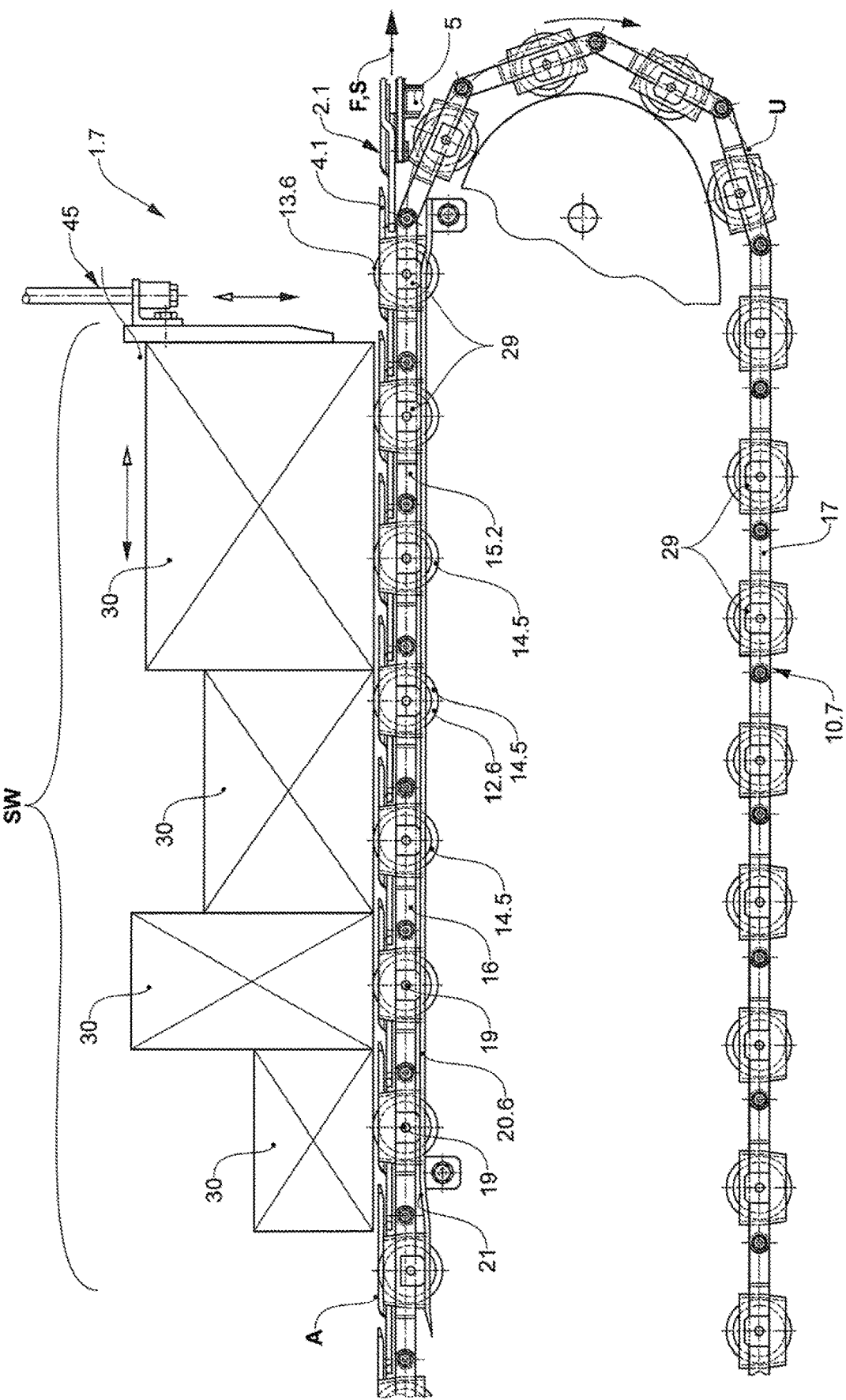

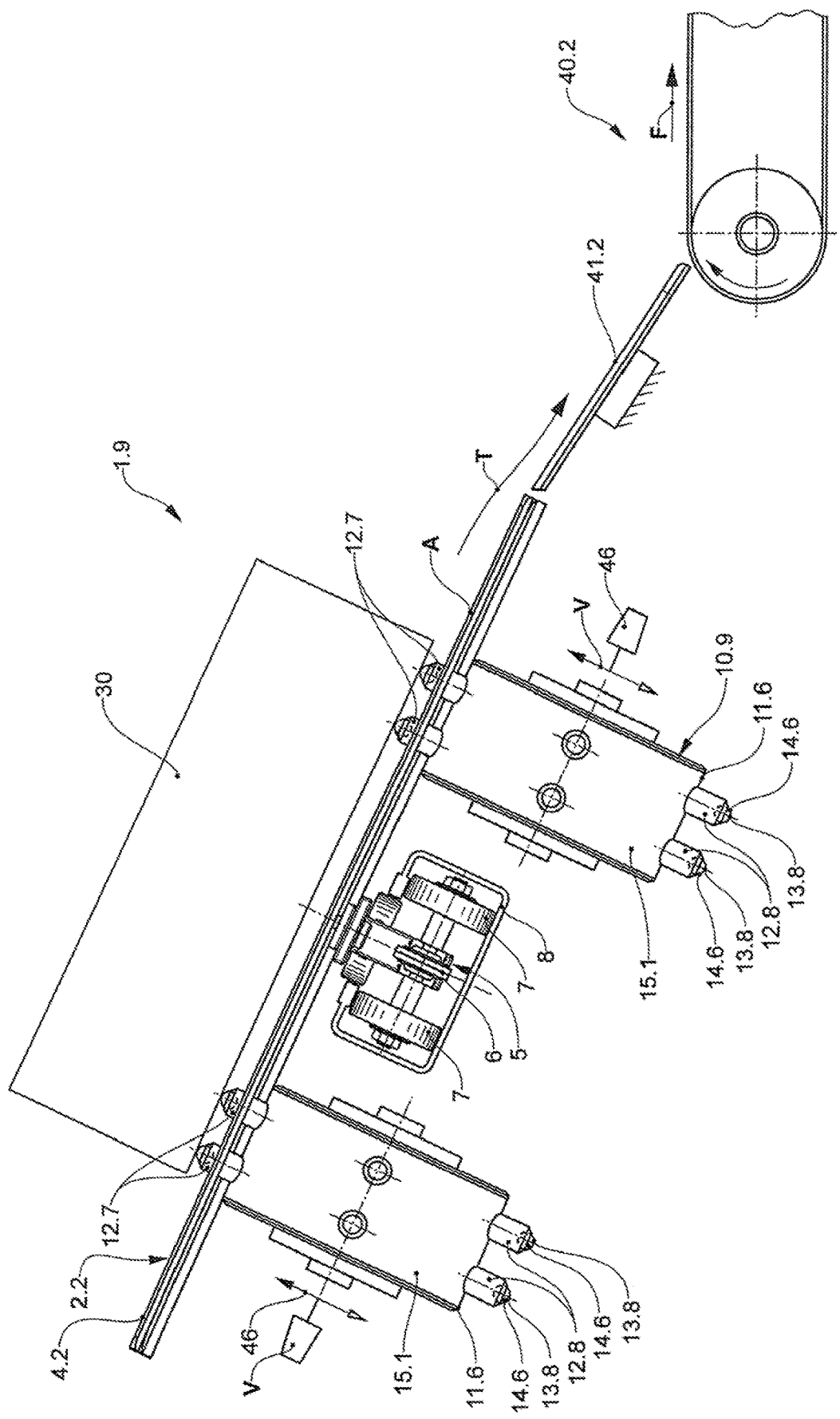

COVERING APPLIANCE WITH A CONVEYING MEMBER

BACKGROUND OF THE INVENTION

Field of the Invention

The invention concerns the field of conveying technology. The invention relates to a conveying appliance with a conveying member that is movable along a conveying stretch and forms a conveying surface for an item to be conveyed, wherein the conveying surface of the conveying member includes openings. The invention moreover relates to a method for operating the conveying appliance.

Description of Related Art

Conveying appliances with an extensively extended conveying member that is movable along a conveying stretch and forms a conveying surface for an item to be conveyed are known from the state of the art.

Indeed, the publication document WO 2012/068699 A1 describes a plate chain conveyor with a plurality of plate elements that are indirectly linked to one another via a conveying chain, the conveyor forming a continuous conveying surface for the item to be conveyed.

The publication document DE 695 06 355 T2 in turn describes a modular belt conveyor with a plurality of modular belt links that are articulately connected to one another into a modular belt.

The conveying principle of such conveying appliances is based on the conveyed item lying on the conveying surface of the conveying member with the assistance of gravity. The conveying surface therefore forms a conveyed item rest. Herein, in particular, the conveying surface is extended in an extensive manner. This has the advantage that the conveyed item does not need to be held during the conveying, as is the case e.g. with a gripper conveyor. The conveyed item can be processed more rapidly and simply by way of this, since no additional devices need to be provided for gripping and letting go of the conveyed item.

However, such conveying appliances are also subject to restrictions with regard to their range of application. Thus, for example, there is a risk of a slippage of the conveyed item from the conveying surface, for example given conveying stretch sections having gradients. The degree of the gradient that the conveying surface can have herein depends on the frictional resistance between the conveyed item and the conveying surface.

For this reason, in conveying stretch sections with gradients, it is desirable to provide a conveying surface with an as high as possible coefficient of friction. This would be achieved, for example, by way of a conveying surface with a rubber coating.

Very generally, a higher coefficient of friction is desired in those conveying stretch sections, in which the conveyed item is to have an as good as possible retention on the conveying surface.

In other conveying stretch sections, the conveyed item in turn should be moved over the conveying surface, in particular pushed, with as little as possible friction. This means that the frictional resistance should be as low as possible.

In this situation, a smaller frictional resistance on the one hand has the advantage that the conveyed item can be moved over the conveying surface with less force effort. On the other hand, a reduced friction also prevents the wearing of the conveying surface as well the damage to the conveyed item due to sliding friction.

Thus for example, a low as possible frictional resistance is desirable, for example at a transfer station, at which the conveyed item is to be pushed from the conveying surface transversely to the conveying direction.

Basically, a lower frictional resistance is desired in those conveying stretch sections, in which the conveyed item must be moved over the conveying surface.

Moreover, a low frictional resistance is also desirable in accumulation zones, in which the conveyed item must be held back given a conveying member that continues to move. A holding-back of the conveyed item can be necessary, for example if a subsequent process takes its course more slowly than a preceding process.

Here too, the friction between the conveying surface that moves further below the conveyed item and the held-back conveyed item leads to wearing on the conveying surface and possibly to damage of the conveyed item due to sliding friction. Moreover, a high sliding friction between the conveyed item and the conveying surface leads to a high accumulation pressure, which in turn can lead to a damage of the conveyed item by way of this for example being squashed or squeezed.

Furthermore, there can also be the desire to move the conveyed item at a higher or lower conveying speed than the conveying member in certain conveying stretch sections. In certain applications, the conveyed item is to remain stationary or even be moved counter to the conveying direction, while the conveying member continues to move in the conveying direction at the conveying speed.

An acceleration of the conveyed item beyond the conveying speed can be necessary for example in a singularisation step, in which the piece items are singularised.

Herein, the aforementioned functions should be implemented without devices that take up much space. In particular, this means that no devices should engage into the conveying space from the side or from above.

The different demands that are mentioned above entail a correspondingly designed conveying appliance having to be provided for the different applications purposes, in which the conveying surface should have certain characteristics, such as frictional characteristics. Thus, for example, the conveying surface of an accumulating conveyor is usefully formed by a carpet of rollers, whereas in contrast the conveying surface of an ascending conveyor should usefully consist of rubber.

It is for this reason that different designs of conveying appliances, such as accumulating conveyors, ascending conveyors, singularising devices, etc., which are each directed towards a specific demand, are known from the state of the art.

Different demands are placed upon the conveying in a large-scale conveying facility, in which the conveyed item runs through different processes. Thus, the conveying facility is to have gradients, in order to convey the conveyed item to different processing planes. Furthermore, accumulation zones are to be formed, in order to take into account the different process speeds along the conveying stretch. In turn, singularising stations are to singularise accumulated piece items. Furthermore, transfer stations are to be provided with transfer zones, at which the conveyed item can be transported from the conveying surface.

Hence the different demands that are placed upon the conveying member of such a conveying facility, particularly on the design of the conveying surface, are often incompatible with one another and indeed are even at odds with one another.

In the state of the art, this problem is solved by way of the application of different conveying devices, each with a conveying member that is designed in an accordingly suitable manner. For this, the conveying devices are arranged in the conveying facility in series along the conveying stretch and are connected to one another by control technology.

However, this solution has the disadvantage that the conveying facility does not have a continuous conveying member. The design and control effort for forming the respective interfaces between the individual conveying devices to the extent that a trouble-free conveying process is guaranteed is accordingly high.

The publication document WO 01/32533 describes a modular belt conveyor with an appliance for changing the frictional resistance of the conveyed item rest during the conveying. The appliance includes a plurality of rollers that are fastened to the modular belt. The pivot-mounted rollers are pivotably mounted on the modular belt via a pivot body.

Hence, the rollers can be pivoted via a cam that is stationary relative to the modular belt and that is arranged below the modular belt, from a passive position, in which the rollers are arranged below the conveying surface, into an active position, in which the rollers project to above the conveying surface. In the active position, the conveyed item now rolls over the protruding rollers with a lower frictional resistance. The rollers can therefore be activated by way of the application of a suitable activation cam, for example in an accumulation zone or at a transfer station, in which zone and station a lower frictional resistance is desirable.

The publication document U.S. Pat. No. 6,571,937 B1 describes a similar concept. In contrast to the publication document WO 01/32533, according to which the rotation axes of the rollers are equally directed and run transversely to the conveying direction, the modular belt includes a first and a second group of rollers, wherein the rotation axes of the first group of rollers are aligned differently to the rotation axes of the second group of rollers. Herein, the rotation axes run at an angle to the conveying direction. The first group and the second group of rollers then, via a control means, can selectively move from a passive position, in which the rollers are arranged below the conveying surface, into an active position, in which the rollers project to above the conveying surface. The conveyed item rolling on the rollers is moved over the conveying surface in different directions depending on which group of rollers is activated.

The rollers that are described above, while interacting with suitable control means, such as cams, permit the characteristics of the conveyed item rest to be changed and adapted to local demands.

However, both aforementioned publication documents have the disadvantage that the conveying member has to be universally provided with corresponding rollers and with assigned mechanisms for lowering and lifting the rollers.

A conveying member that is led in a continuously circulating manner can indeed reach a length of several hundred meters in a conveying facility. Accordingly, such a conveying member is to be equipped with several thousand rollers. It is therefore evident that a conveying appliance that is modified in such a manner leads to significantly increased costs that a customer is not always willing to burden.

SUMMARY OF THE INVENTION

It is therefore the object of the present invention to suggest an alternative conveying appliance that permits the conveyed item to be mechanically influenced by way of active elements that project to above the conveying surface, be it of the purpose of changing the frictional characteristics of the conveyed item rest, be it for changing the conveying speed of the conveyed item relative to the conveying member or be it for carrying out a different type of mechanical influence.

In particular, it is the object of the present invention to put forward a conveying appliance whose conveyed item rest has different mechanical characteristics over different conveying stretch sections depending on the demands.

Herein, the solution of the object should be as inexpensive as possible and in particular should not render necessary a design of the conveying member that is demanding with respect to technology and costs.

Furthermore, the design means for achieving the object, according to a further object should be accommodated in the conveying appliance in a space-saving as possible manner.

For achieving the aforementioned objects, the conveying appliance according to the invention includes an active device with at least one active element that is movable along a closed circulating path, wherein the circulating path in an active section of the conveying stretch forms an actively effective path section (track section) that runs parallel to the conveying member, and the active device interacts with the conveying member in the active section in a manner such that the at least one active element projects through an opening in the conveying surface along the actively effective path section and projects beyond the conveying surface in a manner such that the at least one active element is capable of mechanically or physically acting upon an conveyed item which lies on the conveying surface.

In particular, the conveyed item includes piece items such as, e.g., parcels. The conveyed item can also include containers such as crates or other receptacles which receive the actual product to be conveyed. Inasmuch as this is concerned, the term conveyed item or piece item is also to be understood as associated containers, such as crates etc., by way of which the products are conveyed. Finally, the conveyed item can also include empty containers, such as crates.

In particular, the active section denotes that stretch section of the conveying stretch, in which the at least one active element is capable of mechanically acting upon the conveyed item.

Herein, the at least one active element in particular projects into the conveying space, in which the conveyed item is conveyed.

In particular, the at least one active element forms a contact surface to the conveyed item. The at least one active element herein acts mechanically upon the conveyed item via the contact surface. Accordingly, the active element can also be called a contact element.

In the active section, the contact surface of the at least one active element in particular forms the conveyed item rest or a part of the conveyed item rest or can optionally form these.

The conveyed item rest defines that surface, on which the conveyed item lies.

In contrast, the conveyed item rest is formed by the conveying surface, i.e. the rest body of the conveying member, upstream and/or downstream of the active sections considered in the conveying direction.

The active device is arranged in a stationary manner or at a fixed location relative to the conveying member. I.e. the active device does not move together with the conveying member along the conveying stretch.

In particular, the active device is arranged below the conveying member. Of course, the active elements in their actively effective position are the exception.

In particular, the active device includes several active elements in the actively effective path section. In particular, the active elements are arranged distanced to one another.

The active device can thus include several active elements that are arranged successively along the conveying direction, in the actively effective path section. In particular successively means that the active elements can be arranged one after the other in a column or offset to one another.

Furthermore, in the actively effective path section, the active device can include several active elements that are arranged next to one another transversely to the conveying direction. In particular, next to one another means that the active elements can be arranged next to one another in a row or offset to one another In particular, the conveying member or the subsequently described rest body forms a continuous conveying surface for the conveyed item. The conveyed item lies on the conveying surface.

Continuous means that the conveying member forms a conveying surface over the whole conveying space. The conveying space is consequently defined via the conveying surface of the conveying member.

The conveying surface—with the exception of openings in the conveying surface, in particular for the active elements—in particular is designed in a continuous manner over the whole conveying space.

In particular, the conveying surface of the conveying member is designed in a plane manner.

In particular, the conveying member is designed in a continuous, closed manner and is accordingly movable in a circulating manner.

In particular, the conveying member includes a rest body. The rest body or its rest elements—as yet described hereinafter—form the conveying surface.

In particular, the rest body is designed in a multi-part manner and includes a plurality of rest elements that are linked to one another. The rest elements can be linked to one another in a direct manner (interlinked). The connection between the rest elements that are directly linked to one another in particular is articulated, as is the case, e.g., with modular belts.

The rest elements can also be linked to one another in an indirect manner, e.g. via a chain. In the latter case, the rest elements that can be, e.g., plate elements are fastened to the chain. Such a chain is described in more detail hereinafter.

The rest body can also be designed in a single-part manner, i.e. consist of a single rest element. The rest body can thus be a conveying belt.

According to a further development of the invention, the at least one active element is designed to lift the conveyed item at least partly from the conveying surface in the active section. Accordingly, the active element can also be denoted as a lifting element.

According to a first variant, the conveyed item is completely lifted by the at least one actively effective active element. This means that the conveyed item lies exclusively on the at least one active element in the active section. Accordingly, the conveyed item no longer has any direct contact with the conveying surface of the conveying member in the active section.

Actively effective means that the active element has a mechanical influence on the conveyed item that is conveyed with the conveying member.

According to a second variant, the conveyed item is partly lifted by the at least one actively effected active element. This means that in the active section, the conveyed item lies with a part of its rest surface on the at least one active element and with another part of its rest surface on the conveying surface of the conveying member.

The at least one actively effected active element can therefore, for example, tilt the conveyed item which is to say bring it into an oblique position, in the active region. This can be used to tilt the conveyed item from the conveying surface, possibly with the help of an additional force such as the gravitational force.

In particular, the at least one active element is a projecting element. Herein, the active element in particular protrudes beyond the holding body which is yet described hereinafter. In particular, the active element projects in the direction of the conveying surface or rest body of the conveying member, as is yet described hereinafter. In particular, the active element projects from below in the direction of the conveying surface or rest body of the conveying member.

Herein, the projecting element in particular forms the contact surface that has already been mentioned above. The contact surface can be designed in a plane manner. The contact surface can also be designed in a convex manner.

In particular, the projecting element can be a lug (lifter, cam, boss), a stud, a nub (pimple), a protuberance, a pin or a bristle bundle.

The projecting element can include a rotatably mounted roller body, in particular a roller or ball, or consist of this.

The active device can form a carpet with a multitude of projecting elements in the active section. The carpet is characterised by a multitude of projecting elements that are arranged successively and next to one another in a relatively compact manner.

According to a further development of the invention, the projecting element is designed tapering towards the free end. The projecting element can therefore be designed conically or in the manner of a truncated cone.

The tapering design of the active element towards the free end permits the self-centring of the active element on engaging into the opening at the beginning of the active section given the occurrence of an offset between the opening and the active element.

According to a further development of the invention, the at least one active element, as already mentioned, includes a rotatably mounted roller body or consist of this. Herein, the roller body in particular forms the aforementioned contact surface The roller body can be mounted in a receiving element, such as a guide sleeve, which is open towards the conveying surface.

The roller body can be a roller or a ball. The roller body can be mounted on a pivot. This means that the roller body is rotatably mounted on a holding body about a physical rotation pivot (axle). The roller body can also be rotatably mounted on a holding body in a pivot-free manner. This means that the roller body is not mounted on a physical rotation pivot. If the roller body that is rotatably mounted in a pivot-free manner is a ball, then this in particular is freely rotatable about an arbitrary geometric rotation axis. The roller body that is rotatable in a pivot-free manner can be e.g. ball-mounted.

In the active section, the active device can form a roller carpet with a plurality of roller bodies. The roller carpet is characterised by a multitude of roller bodies that are arranged successively and next to one another in a relatively dense manner.

According to a further development of the invention, the at least one active element engages in an accurately fitting manner, i.e. positively, through the opening, in the active section.

The at least one active element, particularly if this is designed as a projecting element such as a lug, stud, nub, protuberance or pin, can serve for increasing the static friction between the conveyed item and the conveyed item rest. For this, the contact surface of the at least one active element, which in the active section forms the conveyed item rest, has a higher coefficient of friction with respect to the static friction than the conveying surface of the conveying member that outside the active section forms the conveyed item rest.

The at least one active element, particularly if this is designed as a projecting element such as a lug, stud, nub, protuberance or pin, according to a first embodiment can serve for increasing the sliding friction between the conveyed item and the conveyed item rest. For this, the contact surface of the at least one active element, which in the active section forms the conveyed item rest has a higher coefficient of friction with respect to the sliding friction than the conveying surface of the conveying member that outside the active section forms the conveyed item rest.

The contact surface can consist, for example, of an elastomer. The elastomer can be, e.g., rubber.

The increase of the coefficient of friction has the effect that the conveyed item has a higher frictional resistance in the active section, in which this lies on the active elements, and on account of this can only be moved relative to the conveyed item rest with a greater force effort. This is of significance, for example, if the conveyed item threatens to slip over the conveying surface in an uncontrolled or unintended manner or to slip from this due to the gravitational force or due to inertia forces.

The active device according to the invention and according to the first embodiment variant is therefore applied in the region of (positive or negative) gradients of the conveying surface. In the active section, the conveying surface of the conveying member has a corresponding gradient with respect to the horizontal. In these regions, a slippage of the conveyed item from the conveying surface due to gravity is prevented by way of the conveyed item lying on the active elements.

Furthermore, the active device according to the invention and according to the first embodiment can also be applied in the region of curved paths of the conveying surface. The conveying surface of the conveying member accordingly has a curved path in the active section. In these regions, the resting of the conveyed item on the active elements prevents a slipping of the conveyed item away from the conveying surface due to occurring inertia forces.

Furthermore, the at least one active element or the associated active device according to the first embodiment variant can be applied in combination with a lowering and lifting mechanism—as is yet described further below—also in the region of a conveying surface that is inclined transversely to the conveying direction, for the slipping-away of the conveyed item.

An inclined conveying surface is used e.g. in the transfer zone of a transfer station or in the ejecting zone or an ejecting station.

In the active region, the at least one active element can selectively move into the actively effective position or into a passive position by way of the lowering and lifting mechanism.

Should a piece item slip from the inclined conveying surface according to this application, in order, for example, to eject or transfer this, then the at least one active element in the active section is lowered or not lifted by way of the lowering and lifting mechanism, so that the at least one active element in the active section is arranged below the conveying surface and the conveyed item in the transfer zone consequently lies on the inclined conveying surface. Herein, the friction coefficient of the conveying surface is selected such that the piece item in the transfer zone slips from the conveying surface by way of the assistance of gravity.

If the piece item is to be conveyed onwards with the conveying member, thus is not to slip from the conveyed item rest and is consequently not to be ejected or transferred, then the at least one active element is not lowered or lifted in the active section, so that the at least one active element in the active section projects through the openings to above the conveying surface into the conveying space. The coefficient of friction of the contact surface of the at least one active element is herein selected such that the piece item in the transfer zone does not slip away from the conveyed item rest despite the inclined conveying surface. As a result, the piece item lying on the at least one active element is conveyed further through the transfer zone with the inclined conveying surface and is not transferred or ejected.

This application is described in more detail within the framework of the embodiment example according to FIG. 9a.

The device according to the invention is therefore also suitable for the targeted transfer or ejection of piece items at a transfer station.

According to a second embodiment variant, the at least one active element however can also serve for reducing the static friction between the conveyed item and the conveyed item rest in the conveying appliance. For this, the contact surface of the at least one active element, the active element forming the conveyed item rest in the active section, has a lower coefficient of friction with regard to static friction than the conveying surface of the conveying member that outside the active section forms the conveyed item rest.

Furthermore, the at least one active element can also serve for reducing the sliding friction between the conveyed item and the conveyed item rest in the conveying appliance. For this, the contact surface of the at least one active element, the active element forming the conveyed item rest in the active section, has a lower coefficient of friction with respect to the sliding friction than the conveying surface of the conveying member that outside the active section forms the conveyed item rest.

The reduction of the coefficient of friction has the effect that the conveyed item has a lower friction resistance in the active section, in which it lies on the active elements, and on account of this can be moved relative to the conveyed item rest with less force effort—be it then passively by way of the gravitational force or due to inertia forces or actively by way of a force that is exerted upon the conveyed item.

However, the friction resistance can also be reduced by way of the application of active elements with roller bodies. Herein, the piece items no longer slide on the conveyed item rest that is formed by the active elements, but roll on this. Herein, the sliding friction is replaced by the considerably smaller rolling friction.

In particular, the reduction of the friction resistance is used to move the conveyed item over the conveying surface with a reduced force effort.

This is useful, e.g., at an ejecting station or transfer station, at which a transfer element is capable of pushing a piece item from the conveyed item rest with a reduced force effort. Accordingly, the active device according to the invention can be applied in a transfer station.

Leading this concept further, the reduction of the frictional resistance can even be used to move the conveyed item, e.g. likewise at a transfer station, over the conveying surface and in particular from the conveying surface, solely due to inertia forces and in particular solely due to the gravitational force.

If, for example, the gravitational force is utilised, in order to move the conveyed item over the conveying surface and in particular from the conveying surface, then the conveying surface, in the active section, for example has an inclination transverse to the conveying direction.

It is therefore due to the applictaion of an active device according to the invention that, for example, one can make do without the use of moved ejecting elements such as plungers, pushers or sliders, with which the conveyed item is otherwise pushed from the conveying surface.

This has the advantage that the conveyed item is treated in a gentler manner, since no (large) impact impulses act upon the conveyed item due to an ejecting element.

Furthermore, the foregoing of an ejecting element also permits a considerable simplification of the conveying appliance. This is also of significance inasmuch as the mentioned ejection elements need to carry out a linear movement, the mechanical implementation of which being comparatively complicated and also expensive.

Furthermore, forgoing an ejecting element also entails a saving of space, since devices with moved components each demand safety precautions, such as protective grids, coverings, safety distances etc., which take up space.

Here too, the at least one active element or the associated active device can be used in combination with a lowering and lifting mechanism—as yet described further below—in the region of a conveying surface that is inclined transversely to the conveying direction, as has already been described beforehand in the context of the first embodiment variant.

As already mentioned, an inclined conveying surface is applied, e.g., in the transfer zone of a transfer station or in the ejecting zone of an ejecting station.

In the active region, the at least one active element can be moved selectively into the actively effective position or into a passive position by way of the lowering and lifting mechanism.

Here however, in contrast to the first embodiment variant, the at least one active element that reduces the friction resistance with respect to the conveying surface is actively effectively moved into the lifted position, in order to permit the piece item to slip from the conveyed item rest by way of gravitational assistance and to accordingly eject or transfer it.

Should the piece item be conveyed further with the conveying member, thus if it is not be ejected or transferred, then the at least one active element is moved into the lowered, non-actively-effective position, to that the piece item lies on the conveying surface.

The friction coefficient of the conveying surface is herein selected such that the piece item in the transfer zone does not slip from the conveying surface despite the conveying surface being inclined.

As a result, the piece item lying on the inclined conveying surface is conveyed further through the transfer zone and is not transferred or ejected.

Furthermore, a reduced frictional resistance can also be useful in conveying sections such as e.g. at a branching location, in which conveying sections the conveyed item is to be pushed into a predefined position on the conveying surface, e.g. by way of a guide element.

In particular, the openings are arranged in the rest body or in its rest elements. The opening towards the conveying surface form passage openings in the rest body or in the rest elements.

The openings, also called through-openings, in particular are each completely encompassed by the conveying surface, which is formed by the conveying member. In particular, this means that the openings are completely encompassed by the rest member or by the respective rest element.

In particular, the openings can be designed as holes. The holes can be round. The holes can be oval and in particular can be circular or elliptical.

The openings can basically have an arbitrary cross-sectional shape.

It is also possible for the conveying member to include openings with different cross-sectional shapes. Accordingly, in particular the active elements of the active device also have different cross-sectional shapes that are adapted to the cross-sectional shapes of the openings that are assigned to these.

The conveying member or the associated rest body can include an arbitrary number of openings. Furthermore, the openings can also be arranged on the conveying surface in an arbitrary manner. In particular however, the openings are each spaced from one another.

According to a further development of the invention, the conveying member includes a chain, as has already been described above. The chain includes a plurality of chain links that are articulately connected to one another. The chain links are connected to one another via connection interfaces.

In particular, the chain is moved along a guide rail. Herein, the guide rail guides the chain and with this also the rest body or its rest elements, along the conveying stretch.

The chain can be moved along the guide rail in a rolling manner. In particular, the chain can roll on the guide rail via rollers. In particular, the rollers are arranged on the chain. The rollers can be arranged on the chain links. The rollers can be arranged at the connection interfaces between two chain links.

The chain can also be moved along the guide rail in a sliding manner. A combination of a rolling and sliding movement along the guide rail is likewise possible.

According to a further development of the invention, the active device includes a first deflection, in which the at least one active element is deflected from a return section into the actively effective path section. In particular, this first deflection is arranged at the beginning of the active section.

The active device in particular includes a second deflection that is arranged downstream relative to the first deflection and in which the at least one active element is deflected from the actively effective path section into the return section. In particular, the second deflection is arranged at the end of the active section.

The first and the second deflection are accordingly spaced from one another. The return section is accordingly arranged below the actively effective path section.

The deflections include deflecting elements, such as, e.g., deflecting rollers.

According to a further development of the active device, this includes at least one active unit with a continuously circulating flexible holding body, on which the at least one active element is arranged. In particular, the holding body is therefore led along a rotary apparatus.

The active unit or the holding body is deflected together with the active elements in particular at the mentioned deflections. Accordingly, the holding body forms an actively effective holding body section as well as a return section, in the actively effective path section between two deflections.

The holding body can be a chain, a toothed belt or a tape or belt. The term tape is also to be understood as straps or belts. The toothed belt permits a very accurate and accordingly synchronous movement of the active elements relative to the conveying member, through the active region.

In particular, the holding body is arranged below the rest body. In particular, the deflections are arranged below the rest body.

The actively effective holding body section with the at least one active element that is arranged on this faces the lower side of the rest body. In particular, the actively effective holding body section runs parallel to the rest body or to its conveying surface.

According to a further development of the invention, the active device transversely to the conveying direction includes at least two active units that are arranged next to one another and that are each with a flexible holding body that is guided in a continuously circulating manner, and with active elements that are arranged on these active units.

In particular, the guide rail that is mentioned above is arranged between two active units.

According to a further development of the invention, the active device includes a support means. The support means serves for supporting the at least one active element to the bottom in the actively effective path section. In particular, the support means forms a support surface for the support.

The supporting can be direct. This means that the support means supports the active element in a direct manner. This e.g. can be the case if the active element includes a roller body.

The rotatably mounted roller body can therefore be supported in a manner rolling directly on the supports means in the actively effective path section.

The supporting can also be indirect. This means that the support means supports the active element via a component that interacts with this active element. The supports means can therefore support the roller bodies via the roller pivots, about which the roller bodies are rotatably mounted, or via support elements that are connected to the roller pivots. This means that the support means acts upon the roller pivots or the support elements.

The supporting can also be effected indirectly via the holding body. This is particularly the case, for example, if the active element is designed as lugs, studs, nubs, protuberances or as a pin.

The support means has the function of the at least one active element not being able to move away downwards due to the action of a vertical force. Such a vertical force is exerted for example by way of a conveyed item that bears on the at least one active element.

In particular, the support means forms a support surface that is stationary relative to the moved conveying member. In particular, the support surface is designed in a plane manner. The support surface can run parallel to the conveying surface.

The support means can be designed in a rigid manner. The support means can include a plate element.

According to a further development of the invention, the support means includes a contact member that, in the actively effective path section, is movable counter to the conveying direction. The contact member can also be movable in the conveying direction.

The contact member forms the support surface. Accordingly, the at least one active element lies on the contact member in a direct or indirect manner in the actively effective path section, as is described above.

In particular, the contact member is designed in a flexible manner. In particular, the contact member is led in a continuously circulating manner via deflections. Accordingly, the contact member can be guided along a rotary apparatus.

The contact member can be designed as a chain or a belt.

The contact member can be passively driven, e.g. via the rolling roller bodies of the active element.

The contact member can also be actively driven by way of a drive. For example, an actively driven contact member can actively drive roller bodies of the active element that roll on the support surface. As to what such an active drive of the roller bodies by way of the contact member precisely means is yet explained in more detail further below.

According to a further development of the invention, the support means can include several support rollers that, in particular, are successively arranged in the conveying direction and via which the contact member is guided, particularly in the active section. The support rollers are consequently arranged below the contact member.

The support rollers permit the low-friction movement of the contact member over the support rollers given a simultaneous supporting by the support rollers. This is thanks to the considerably reduced rolling friction that occurs instead of sliding friction According to a variant of the aforementioned further development, the support means include a roller body. The roller body includes a plurality of rotatable support rollers that are led in a circulating manner around a central support body. The support rollers are accordingly guided around the support body in a rolling manner. In particular, the support rollers are connected to one another via a flexible connection body for this.

The roller body forms an actively effective roll section that runs parallel to the actively effective path section or to the conveying surface. The contact member runs along the actively effective roll section above the support rollers and in the active section is supported by way of these. Herein, the forces that bear on the lateral surface of the support roller in the active section are transmitted onto the support body.

According to a further development, the at least one active element and in particular the active device, in the active section, is selectively lowerable and liftable relative to the conveying surface via a lowering and lifting mechanism.

This being in a manner such that in a lifted, i.e. actively effective position, the at least one active element, in the active section, projects through the openings to above the conveying surface and into the conveying space, and in a lowered, i.e. passive position, the at least one active element in the active section is arranged below the conveying surface. I.e., the at least one active element in the passive position does not project to above the conveying surface in the active section and therefore has no mechanical influence upon the conveyed item.

The lowering or lifting of the at least one active element by way of the lowering and lifting mechanism is not to be confused with the movement course of the at least one active element in the deflections at the beginning and at the end of the active section. The lowering or lifting of the at least one active element in the active section by way of the lowering and lifting mechanism in particular takes place between the two deflections.

One can therefore envisage for example the support means or parts thereof being lowerable and liftable by way of the lowering and lifting mechanism.

One can also envisage the complete active device or its active units being lowerable and liftable by way of the lowering and lifting mechanism.

In particular, the lowering and lifting mechanism is operated via a control. The lowering and lifting mechanism can be operated e.g. pneumatically or via an electrical drive.

In particular, the at least one active element can be lifted and lowered by way of the lowering and lifting mechanism during the conveying process.

The lowering and lifting mechanism permits the selective mechanical influencing of the conveyed item in the active section by way of the at least one active element.

The lowering and lifting of the at least one active element according to the above description is particularly useful if a targeted mechanical influence is to be made upon individual, but not all piece items, in a conveying stretch section.

Herein, the absence of an influence of the active element upon the piece item can indeed also initiate a processing step, such as e.g. the slipping of the piece item from the conveying member. As already described above, this is the case, for example, at an ejection station or transfer station, in which piece items are to be selectively ejected or transferred.

The conveying appliance can be designed as a plate chain conveyor and the conveying member as a plate chain. According to this embodiment, the rest elements of the rest body are plate elements. In particular, the plate elements are linked to one another indirectly via a chain. This means that the plate elements are attached to the chain.

The conveying appliance can also be designed as a mat chain conveyor and the conveying member as a mat chain. According to this embodiment, the rest elements of the rest body are mat chain links that are directly linked to one another.

Furthermore, the conveying appliance can also be designed as a modular belt conveyor and the conveying member as a modular belt. According to this design, the rest elements of the rest body are modular belt links that are directly linked to one another.

The conveying appliance can also be designed as a belt conveyor and the conveying member as a conveying belt. According to this design, the rest body is formed by the conveying belt.

The invention also relates to a method for influencing the conveyed item that lies on the conveying surface of the conveying member during a conveying process by way of a conveying appliance which is described above.

According to the method according to the invention, the conveyed item is conveyed in a manner lying on the conveying surface of the conveying member, said conveying member being moved in the conveying direction. In particular, the term "lying on" means that the conveyed item lies on the conveying surface with the assistance of gravity.

The method is characterised by the following steps:
the engaging of the at least one active element into an opening in the conveying member along an active section,
mechanically influencing the conveyed item in the active section by way of forming an active contact between the conveyed item and the at least one active element that projects to above the conveying surface;
ending the mechanical influencing of the conveyed item and
moving the at least one active element out of the opening at the end of the active section.

In the active section, the at least one active element therefore projects beyond the conveying surface into the conveying space, in which the conveyed item is conveyed.

The moving of the at least one active element into the opening as well as the moving of this out of the opening is effected given a continued conveying.

According to a further development of the invention, the mechanical influencing concerns the lifting of the conveyed item from the conveying surface by way of the at least one active element. Hereby, the at least one active element is introduced into the opening of the conveying member until it protrudes out of the opening at the conveying side and projects beyond the conveying surface.

The moving of the at least one active element into the opening at the beginning of the active section in particular is effected in a first deflection, in which the at least one active element is deflected from the return section into the actively effective path section. Herein, the at least one active element is moved from below towards the conveying surface or the support body.

In the active section, the positions of the active elements and of the openings are matched to one another in a manner such that the active elements that at the first deflection are led from below up to the openings are in register with the openings (register-like, congruently).

As has already been mentioned further above, the active device in particular includes several active elements in the active section, in a manner such that the conveyed item is lifted from the conveying surface by way of several active elements that protrude out of the openings below the conveyed item.

According to a further development of the invention, the conveyed item is completely lifted from the conveying surface by way of the at least one active element. The conveyed item no longer has any physical contact with the conveying surface on account of this.

In particular, the conveyed item is lifted to an extent such that a distance of 1 mm or more, in particular of 2 mm or more is formed between the contact surfaces of the active elements and the conveying surface.

In particular, the conveyed item is lifted to an extent such that a distance of 20 mm or less, in particular of 10 mm or less is formed between the contact surfaces of the active elements and the conveying surface.

In particular, the at least one active element and the conveying member are moved through the active section at the same speed, i.e. synchronously. In particular, the speed corresponds to the conveying speed.

Since the openings are moved together with the conveying member along the conveying stretch in the conveying direction at the conveying speed, the at least one active element is accordingly also moved through the active section at the same speed as the openings.

Now, the at least one active element in particular is driven by the conveying member itself. This is effected by way of the conveying member exerting a driving force upon at least one active element that engages through the opening.

Herein, it is important for at least one active element to be located in an actively effective position, in which this element engages through the opening in the conveying surface, at every point in time of the conveying. Only thus is it ensured that the active elements or the associated holding body with the active elements are continuously driven by the conveying member and the openings and the active elements remain in register with one another However, it is also possible for the at least one active element to be actively driven via a drive. In this case however, the drive of the conveying member and the drive of the at least one active element must be synchronised with one another via a control. Only thus can it be ensured that the at least one active element and the conveying member move through the active section at the same speed.

The ending or completion of the mechanical influencing here corresponds to a lowering of the conveyed item onto the conveying surface. With this procedure, the contact surface of the at least one active element is lowered to the level of the conveying surface or below the conveying surface by way of moving the at least one active element out of the opening, so that the conveyed item lies on the conveying surface again.

In particular, the moving of the at least one active element out of the opening at the end of the active section is effected in a second deflecting region, in which the at least one active element is deflected from the actively effective path section into the return section. Herein, the active elements are moved downwards away from the conveying surface or from the rest body.

If the at least one active element is arranged on a holding body, then the holding body slides with the at least one active element in particular on the support surface of a support means.

If the at least one active element includes a roller body, then—as already mentioned above—this can roll on the support surface of the support means.

The aforementioned support means can also act as an actuating means additionally to its supporting function. The action as an actuating means is characterised in that the at least one active element is moved through the opening in the conveying surface by the support means at the beginning of the actively effective path section.

In particular, this is effected by way of the at least one active element or the associated holding body being moved past the support means.

In this context, the support means can act as a cam.

The support means that act as actuating means can be driven for assuming its actuating function. In particular, the support means can be engaged and disengaged, expressed more generally, can be brought into and out of the system.

In the active section, the at least one active element is held in its actively effective position by the support means on carrying out its supporting function.

According to a particular embodiment of the method, the at least one active element is actively effectively lifted through the opening to above the conveying surface by way of the lowering and lifting mechanism, for mechanically influencing the piece item in the active section.

The at least one active element is lowered in the active section to below the conveying surface by way of the lowering and lifting mechanism for the purpose of not influencing the piece item in the active section.

The active device together with the mentioned lowering and lifting mechanism can be provided for example for selectively carrying out a processing step on individual piece items. Such a processing step can be e.g. the ejecting or the transfer of a piece item from the conveying member, as has already been described above.

The processing step can now be initiated or carried out by the mechanical influencing of the conveyed item by way of the at least one active element. This for example is the case at a transfer station or ejecting station with an inclined conveying surface, at which the at least one active element ensures a reduction of the static friction as has already been described further above by way of a further development of the invention.

However, it is also possible for the processing step to only be initiated or executed by way of the ending the mechanical influencing of conveyed item by way of the at least one active element. This for example relates to a transfer or ejecting station with an inclined conveying surface, at which the at least one active element ensures an increased static friction as is already described further above by way of a further development of the invention.

According to a particular embodiment, the at least one active element, as already mentioned, includes a roller body that is supported in a rolling manner on a driven contact member. Herein, the driven contact member actively brings the roller body into rotation.

The contact member can be driven, for example, in the conveying direction. In this case, the peripheral section of the at least one roller body that forms the contact surface and that projects to above the conveying surface rotates counter to the conveying direction. The described rotation of the roller body therefore drives the conveyed item counter to the conveying direction, relative to the roller body.

The conveying member consequently moves through the active section at a higher speed than the conveyed item.

According to a first variant, the contact member is now driven in the conveying direction at a speed and accordingly the at least one roller body at a peripheral speed that is smaller than double the conveying speed of the conveying member and is greater than the conveying speed of the conveying member.

Since the roller body itself is moved through the active section in the conveying direction together with the conveying member at the conveying speed of the conveying member, and further rolls on the contact member, the conveyed item that lies on the at least one roller body continues to move in the conveying direction in the active section, but more slowly than the conveying member that continues to be moved in the conveying direction at the conveying speed.

According to a second variant, the contact member is driven in the conveying direction at a speed that is the same as double the conveying speed of the conveying member. Since the roller body itself together with the conveying member is moved in the conveying direction through the active section at the conveying speed of the conveying member and moreover rolls on the contact member, the conveyed item remains stationary on the conveying member that continues to be moved in the conveying direction at the conveying speed.

According to a third variant, the contact member is driven in the conveying direction at a speed and accordingly the at least one roller body at a peripheral speed that is larger than double the conveying speed of the conveying member. Although the roller body itself together with the conveying member is moved through the active section in the conveying direction at the conveying speed of the conveying member, the conveyed item moves counter to the conveying direction.

The aforementioned variants can be used, for example, in holding-back or accumulating zones, in which the piece items must be temporarily held back, which is to say accumulated.

Moreover, active elements with roller bodies that are freely rotatable in the active section can also be applied in holding-back zones or accumulating zones of conveying appliances. This, for example, is the case if the roller bodies are supported on the support means in an indirect manner via the holding body. In this case, the lateral surface of the roller bodies in particular does not form any contact to the support means.

Given a conveying member that continues to move in the conveying direction, the held-back or accumulated conveyed item can roll on the roller bodies due to the application of these roller bodies. An excessive friction is avoided by way of this, said excessive friction being unavoidable if the conveyed item lies directly on the conveying member that continues to move below the conveyed item.

According to a fourth variant, the conveyed item moves in the conveying direction at a higher speed than the conveying speed of the conveying member. This is achieved by way of the contact member:
  a. being driven in the conveying direction at a speed that is smaller than the conveying speed of the conveying member, or
  b. not being driven at all, thus being stationary, or
  c. being driven in a direction opposite to the conveying direction.

In a particular situation, in which the contact member is not driven, the conveyed item has double the conveying speed of the conveying member. This is due to the fact that, on the one hand, the conveying member itself is moved through the active section at the conveying speed and, with this, the conveyed item that lies thereon. On the other hand, the rollers bodies roll on the contact member at the conveying speed and therefore additionally drive the conveyed item that lies on the roller bodies, in the conveying direction.

The aforementioned fourth variant can be applied, for example, in a singularising zone, in which the piece items must be singularised.

The present invention, in limited stretch sections along the conveying stretch, permits the characteristics of the conveyed item rest to be changed in a targeted manner, without any costly modifications having to be done on the conveying member itself. The design measures for achieving the desired functionality of the conveyed item rest are restricted exclusively to the respective path stretch section along the conveying stretch—with the exception of the openings in the conveying surface.

The possibility of mechanically influencing the conveyed item by way of comparatively simple means permits an extension of the functionality of the conveying appliance with little effort.

Thus, for example, an increased static friction of the conveyed item on the conveyed item rest in defined stretch sections permits pronounced gradients along the conveying stretch. On the other hand, a reduced static friction and sliding friction permits the displacement of the conveyed item over the conveyed item rest with a low force effort.

Since the conveying member does not need to be modified with costly design measures for this, the present invention is inexpensive to implement. Furthermore, the present invention also permits a later retrofitting of existing conveying facilities.

BRIEF DESCRIPTION OF THE DRAWINGS

The subject-matter of the invention is hereinafter explained in more detail by way of embodiment examples that are represented in the accompanying figures. Schematically in each case are shown in:

FIG. 2a a perspective view of a second embodiment of a conveying appliance with an active device according to the invention, obliquely from above;

FIG. 5 a front elevation of a fifth embodiment of a conveying appliance with an active device according to the invention;

FIG. 6 a front elevation of a sixth embodiment of a conveying appliance with an active device according to the invention;

FIG. 7 a lateral view of a seventh embodiment of a conveying appliance with an active device according to the invention in an accumulation zone;

FIG. 9b in the conveying direction, a view of a tenth embodiment of a conveying appliance with an active device according to the invention in a transfer zone;

FIG. 10b a plan view of the holding body according to FIG. 10a;

DETAILED DESCRIPTION OF THE INVENTION

Figure 1A:
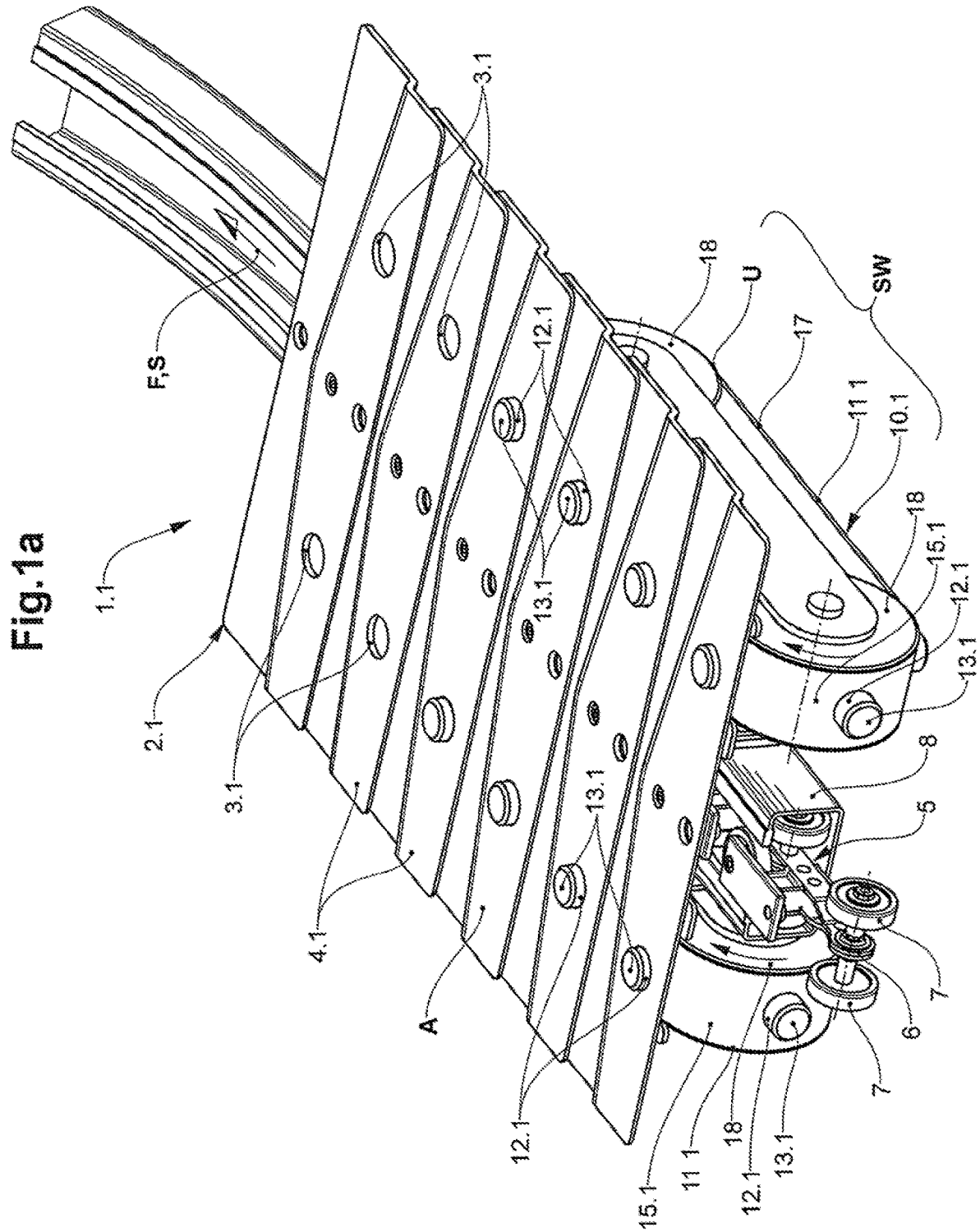
FIG. 1a obliquely from above, a perspective view of a first embodiment of a conveying appliance with an active device according to the invention.

In the figures, the parts are basically provided with the same reference numerals.

Common to FIGS. 1 to 9 is the fact that these each show a specific embodiment of a conveying appliance 1.1-1.9 according to the invention, each with an active device 10.1-10.9. The conveying appliance 1.1-1.9 according to FIGS. 1 to 9 includes a plate chain conveyor with a conveying member 2.1-2.2. The conveying member 2.1-2.2 consist of a chain 5 with plate elements 4.1-4.2 that are attached on this. The conveying appliance 1.1-1.9 further includes a guide rail 8 for guiding the conveying member 2.1-2.2.

The chain 5 is formed from a plurality of runner carriages 6 with rollers 7, the carriages being articulately connected to one another. The runner carriages 6 are led in a guide channel of the guide rail 8.

The plate elements 4.1-4.2 that are fastened to the carriages 6 each include through-openings 3.1-3.2, into which the active elements 12.1-12.4 that are yet described hereinafter engage in the active section SW.

The plate elements 4.1-4.2 form a conveying surface A that is suitable for the resting (support) of the conveyed item. The plate elements 4.1-4.2 are arranged on the chain 5 in such an overlapping manner to one another that they remain overlapping even when fanning out in curved paths.

Figure 1B:
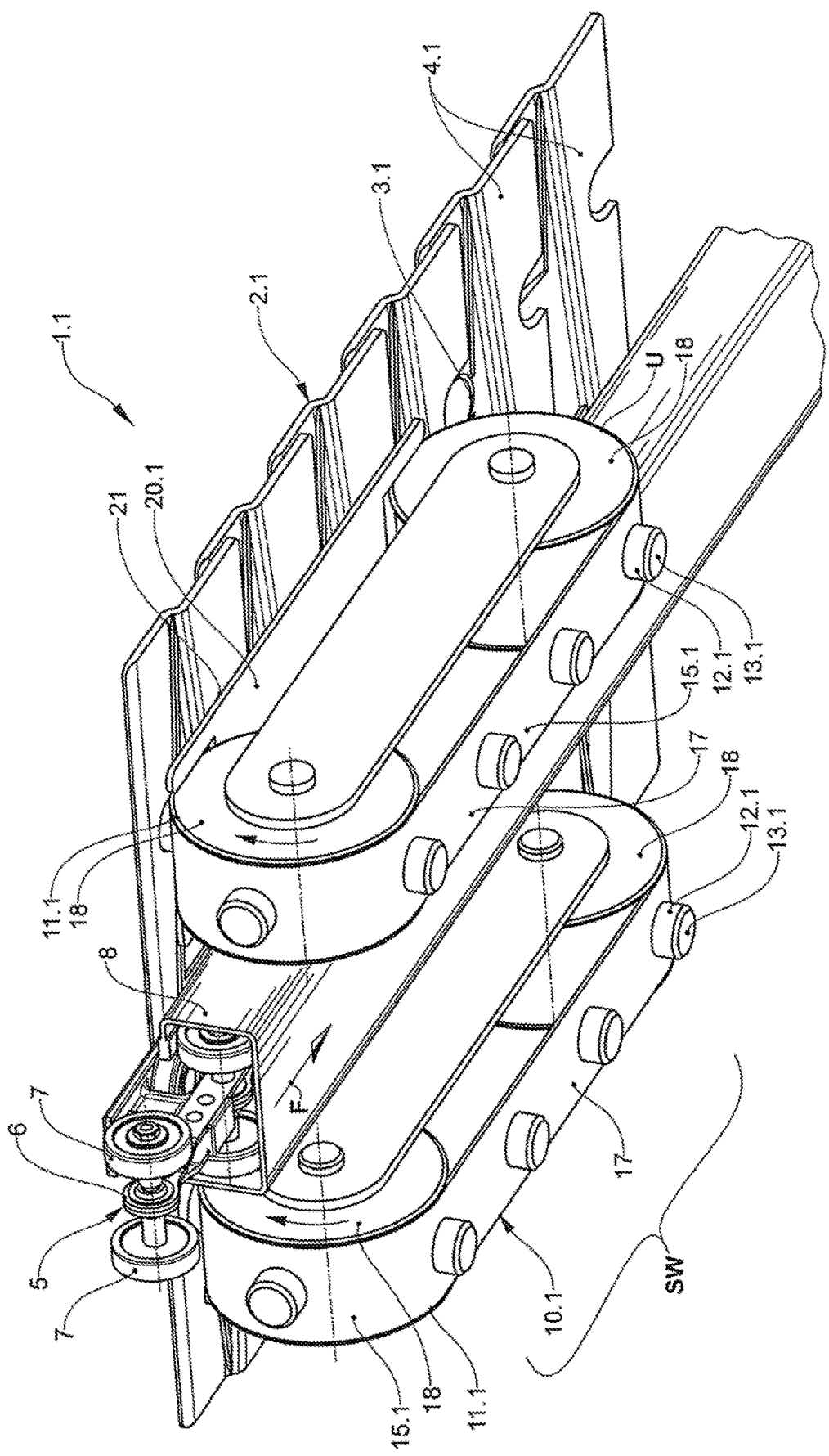
FIG. 1b a perspective view of the conveying appliance according to FIG. 1a obliquely from below.

The embodiments according to FIG. 1a, 1b; 2a, 2b; 4 as well as 9a, 9b are characterised by an active device 10.1, 10.2, 10.4, 10.9 that each include two active units 11.1, 11.2, 11.3, 11.6 that are arranged next to one another and spaced from one another transversely to the conveying direction F. Herein, the guide rail 8 runs below and along the conveying stretch S between the two active units 11.1, 11.2, 11.3, 11.6.

The active units 11.1, 11.2, 11.3, 11.6 each include a plurality of active elements 12.1, 12.2, 12.7 that are arranged successively on a circulating holding body 15.1 and spaced from one another.

In the mentioned embodiments, the holding body 15.1 is designed as a belt, on which the active elements 12.1, 12.2, 12.7 are arranged.

The active units 11.1, 11.2, 11.3, 11.6 each include two deflections having the design of deflecting rollers 18. However, other embodiments of deflections can also be applied instead of deflection rollers 18.

At a first deflection or deflecting roller 18 that is arranged at the beginning of the active section SW, the holding body 15.1 with the active elements 12.1, 12.2, 12.7 are deflected from a return section into an actively effective section.

Herein, the active elements 12.1, 12.2, 12.7 in the first deflection are moved from below up to the through-openings 3.1, 3.2 in the plate elements 4.1, 4.2. In the active section, the positions of the active elements 12.1, 12.2, 12.7 and of the through-openings 3.1, 3.2 are matched to one another in a manner such that the active elements 12.1, 12.2, 12.7 that at the first deflection are moved from below up to the through-openings 3.1, 3.2 can be led into the through-openings 3.1, 3.2 and through these.

In the subsequent active section SW, the active elements 12.1, 12.2, 1.2.7 project out of the through-openings 3.1, 3.2 to above the conveying surface A. Herein, the conveying member 2.1 exerts a driving force upon the active elements 12.1, 12.2, 12.7, so that these together with the holding body 15.1 move synchronously with the conveying member 2.1 through the active section SW. However, this procedure also relates to the other specified embodiments.

The active elements 12.1, 12.2, 12.7 that protrude out of the through-openings 3-1, 3.2 to above the conveying surface A, in the active section now lift the piece item that lies on the conveying surface and covers the through-openings 3.1, 3.2 from the conveying surface A, in a manner such that the respective piece item now only lies on the contact surfaces 13.1, 13.2 of the active elements that form a piece item rest. This means that the piece item no longer has any contact with the conveying surface A.

At a second deflection or deflection roller 18 that is arranged at the end of the active section SW downstream relative to the first deflection, the holding body 15.1 with the active elements 12.1, 12.2, 12.7 is deflected from the actively effective section back into the return section.

Herein, in the second deflection, the active elements 12.1, 12.2, 12.7 are led downwards away from the through-openings 3.1, 3.2 into the return section. Accordingly, the active elements 12.1, 12.2, 12.7 are moved out of the through-openings 3.1, 3.2.

The aforementioned procedure in the region of the deflections furthermore also relates to the embodiments examples according to FIGS. 3, 5 to 8 and 10 that are described further below and concerning which the holding body 15.2 is designed as a chain and the active elements as roller bodies 12.3-12.6.

According to the first embodiment example according to FIGS. 1a and 1b, the active elements are designed as lugs 12.1 that have a contact surface 13.1 with a high coefficient of friction for the conveyed item. The contact surface 13.1 for example is of rubber.

The active device 10.1 further includes a support means 20.1 in the form of a support plate, the support means being arranged below the actively effective section of the holding body 15.2. The support plate 20.1 forms a support surface 21, over which the holding body 15.2 slides in the actively effective path section.

The piece item that lies on the lugs 12.1 in the active section SW is now better secured against slipping away from the conveying member 2.1, 2.2 on account of the greater coefficients of friction of the contact surfaces 13.1 of the lugs 12.1. On account of this, the piece item can also be conveyed along gradients, in which this would otherwise slide from the conveying surface.

Figure 2B:
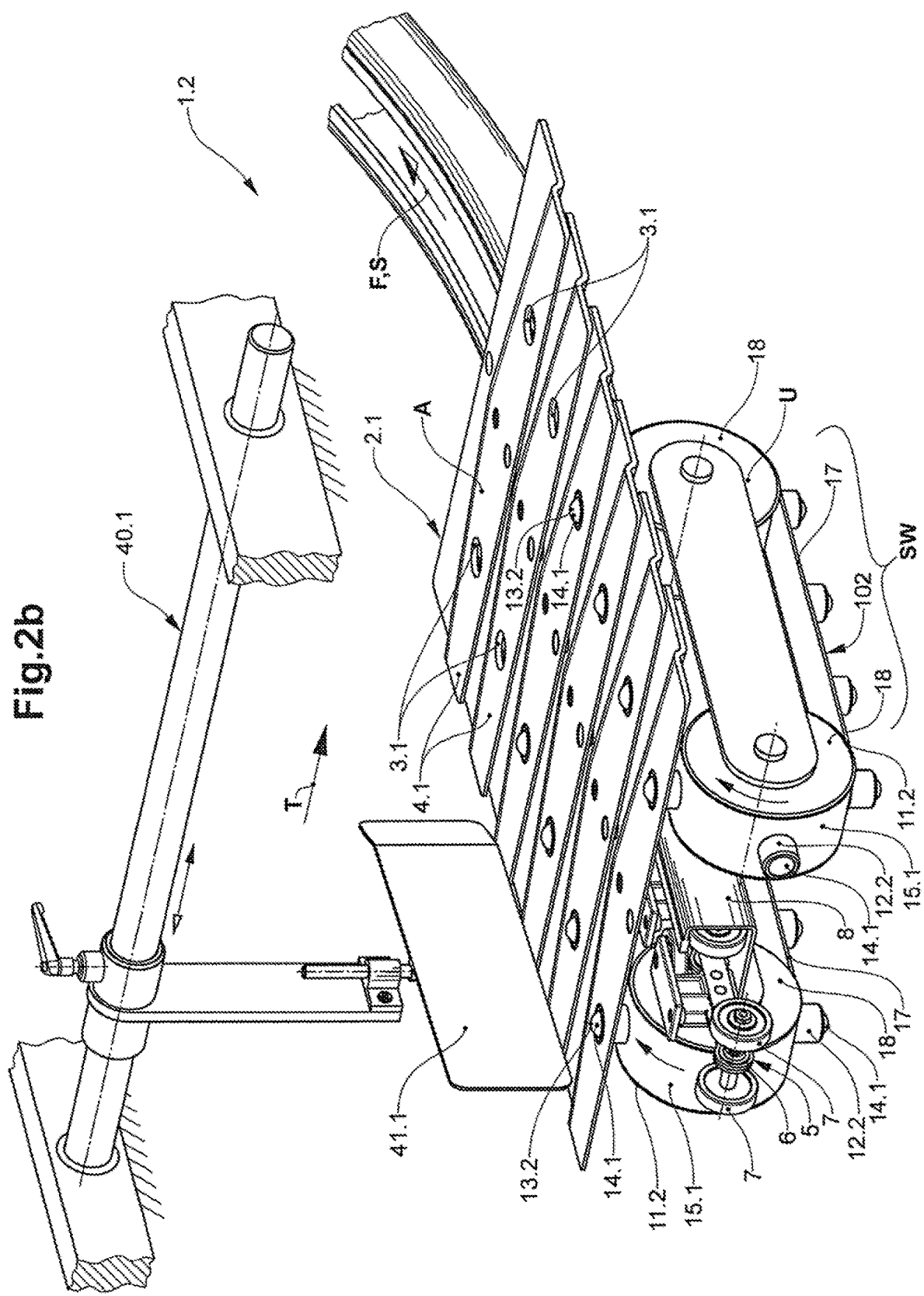
FIG. 2b the conveying appliance according to FIG. 2 with a slider (pusher) member.

According to the second embodiment example according to FIGS. 2a and 2b, the active elements 12.1 each include a rotatably mounted roller body 14.1 that has a contact surface 13.2 for the piece item. The contact surfaces 13.2 of the roller bodies 14.1 form a piece item rest.

The friction resistance between the piece item and the piece item rest is lowered to a significant extent due to the rotatability of the roller bodies 14.1. The piece item can therefore be displaced on the conveying member with a low force effort, wherein it is only rolling friction that acts.

This effect is utilised according to FIG. 2b in the context of a transfer station 40.1 of the conveying appliance 1.2. The piece items are to be pushed from the conveying surface A by way of a slider or pusher 14.1, at the transfer station 40.1. The piece item can be pushed from the conveying surface practically without any frictional resistance thanks to the roller bodies 14.1. This, on the one hand, has the advantage that the slider only needs to exert a low force or low impulse upon the piece item and, on the other hand, that the piece item does not chafe on the piece item rest. The piece item consequently undergoes a more gentle treatment in the transfer station 40.1.

Figure 3:
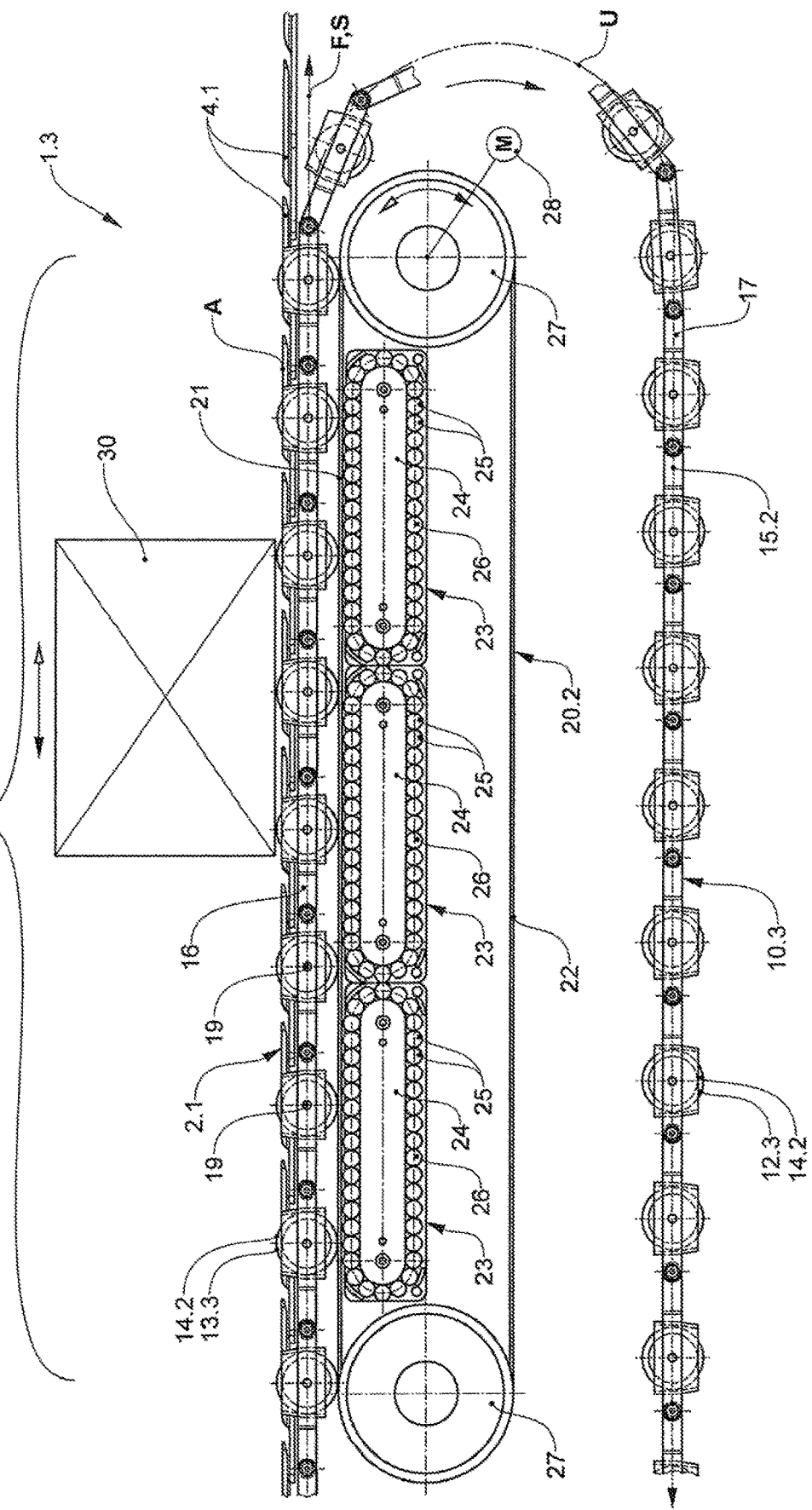
FIG. 3 a lateral view of a third embodiment of a conveying appliance with an active device according to the invention.

The holding body 15.2 according to a third embodiment, shown in FIG. 3, consists of a chain with a plurality of chain links that articulately connected to one another. Rollers 14.2 are arranged on the chain in a rotatably mounted manner via rotation pivots 19. These rollers form the active elements 12.3. The rollers 14.2 have corresponding contact surfaces 13.3.

In particular, the present embodiment is characterised by the feature of the rollers 14.2 being able to be actively driven. For this, the support means 20.2 that supports the rollers 14.2 to the bottom includes a flexible, belt-like contact member 22 that is led in a circulating manner. The contact member 22 forms the support surface 21 for the rollers 14.2.

The rollers 14.2 now roll along on the contact member 22. The contact member 22 is deflected at two deflections that are spaced from one another along the conveying stretch S in the active section. The contact member 22 towards the plate elements 4.1 forms an actively effective contact section as well as a return section that is arranged below the actively effective section. The deflections are designed as deflecting rollers 17 in the present embodiment example.

The contact member 22 is driven via a drive 28 that is actively connected to one of the deflecting rollers 27.

If the contact member 22 is now driven in its actively effective contact section counter to the conveying direction F, then the rollers 14.2 are brought into rotation and accelerate the piece item in the conveying direction F. Since the rollers 14.2 that engage through the through-openings— driven by the conveying member 2.1—are already moved through the active section SW in the conveying direction F at the conveying speed of the conveying member 2.1, the piece items 30 now have a greater speed than the conveying speed of the conveying member 2.1.

An additional acceleration of the piece items 30 is utilised for example within the framework of a singularising procedure, e.g. at a singularisation station.

Conversely, the contact member can also be driven in the conveying direction F in its actively effective section. The rollers 14.2, which this time are brought into rotation in the opposite rotation direction, accelerate the piece items counter to the conveying direction F. Since the rollers 14.2—as mentioned above—are already moved through the active section SW in the conveying direction F at the conveying speed of the conveying member 2.1, the piece items 30 now have a lower speed compared to the conveying speed of the conveying member 2.1.

If the peripheral speed of the rollers 14.2 is smaller than the conveying speed of the conveying member 21, then the piece items 30 still move in the conveying direction F, even if at a reduced speed.

If the peripheral speed of the rollers 14.2 is greater than the conveying speed of the conveying member 21, the piece items 30 even move counter to the conveying direction F.

In a special case, the peripheral speed of the rollers 14.2 corresponds to the conveying speed of the conveying member 2.1. In this case, the piece items remain on location despite the moving rollers 14.2 and the moving conveying member 21.

A slowing-down of the piece items 30 with respect to the conveying speed of the conveying member 2.1 is utilised, for example, along the conveying stretch S in holding-back sections, in which the piece items are to be held back or accumulated.

Since the belt-like contact member 22 needs to accommodate a weight load in the actively effective section, this member is supported to the bottom in this section. Basically, the contact member 22 can slide over a rigid support element with a support surface, as is represented for example in FIG. 1b. However, since such a support element creates a high friction and thus wearing as well as noise, the belt-like contact member 22 according to the present embodiment is supported to the bottom in a rolling manner.

The rolling supporting is formed by three roller bodies 23 that are arranged one after the other in the conveying direction F. The roller bodies 23 each include a plurality of freely rotatable support rollers 25 that peripherally roll around a central support body 24. The support rollers 25 are connected to one another via a flexible connection body 26. The rollers bodies 23 each form an actively effective roll section that runs parallel to the actively effective holding body section 16 of the holding body 15.2. The holding body 15.2 runs with its actively effective holding body section above the support rollers 25 and in the actively effective roll section is supported to the bottom in an indirect manner by these via the contact member 22.

Figure 4:
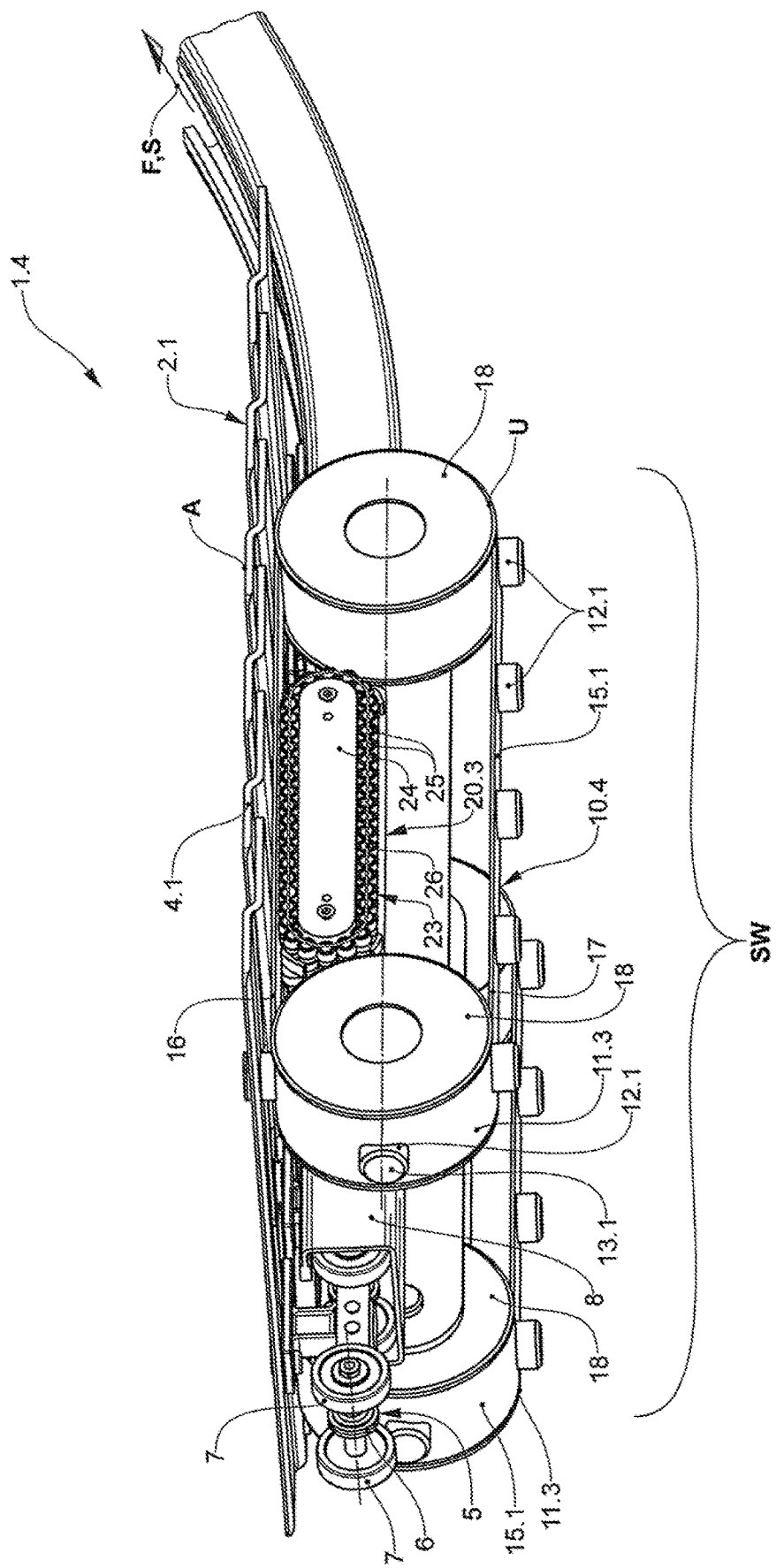
FIG. 4 a perspective view from the side, of a fourth embodiment of a conveying appliance with an active device according to the invention.

Such a roller body 23 is moreover also shown in the embodiment according to FIG. 4.

Of course, the active device 10.3 can also include more than three or less than three of the roller bodies 23 that are described above.

Furthermore, the active device 10.3 can likewise include two active units with the guide rail 8 that leads through between these (not shown), analogously to the embodiment examples according to FIG. 1a, 1b; 2a, 2b; 4-6 and 9a, 9b.

Herein, as described above, each active unit each includes a holding body 15.2, rollers 14.2, a contact member 22 and three roller bodies 23.

The active units 11.3 of the active device 10.4 according to the fourth embodiment of a conveying appliance 1.4 according to the invention and according to FIG. 4 each only include a single one of the previously described roller bodies 23.

Here, the roller body 23 forms the support means 20.3 for supporting the actively effective holding body section 16 of the belt-like holding body 15.1. This represents an alternative solution to the support plate 20.1 according to FIG. 1b. According to the present embodiment, the holding body 15.1 with its actively effective section is supported in a low-friction manner via the rolling rollers 25 of the roller body 23.

The conveying appliance 1.5, 1.6 according to the fifth embodiment according to FIG. 5 and the sixth embodiment according to FIG. 6 each likewise includes an active device 10.5, 10.6 with a holding body 10.5, 10.6 that is designed as a chain. Roller bodies 14.3, 14.4 are rotatably mounted on the chain. They form the active elements 12.4, 12.5. The roller body 14.3 according to FIG. 5 is designed as a ball. The roller body 14.4 according to FIG. 6 is designed as a roller. The roller body 14.3, 14.4 forms a contact surface 13.4, 13.5 for the piece item.

The roller bodies 14.3, 14.4 are supported to the bottom via the support surface 21 of a support means 20.4, 20.5, the support means not being specified in more detail.

The seventh embodiment according to FIG. 7, analogously to the embodiment according to FIG. 3, likewise shows an active device 10.7 with a holding body 15.2 that is designed as a chain and with roller bodies 14.5 that are arranged thereon, are rotatably mounted via rotation pivots 19 and form the active elements 12.6.

In contrast to the embodiment according to FIG. 3, the roller bodies 14.5 are not supported directly on a roller body or a contact member that is arranged thereabove. In contrast, the roller bodies 14.5 are indirectly supported on the support surface 21 of the support means 20.6 via the holding body 15.2 or the chain, said support means being designed as a guide cam. Special support elements 29 are provided on the chain for this. Herein, in the active section SW, the chain slides with the support elements 29 over the guide cam 20.6.

Since the roller bodies 14.5 are fixedly connected to the chain via their rotation pivots 19, the roller bodies 14.5 are also indirectly supported due to the support of the chain, so that these roller bodies cannot move away downwards in the active section SW out of the through-openings.

The indirect supporting of the roller bodies 14.5 has the advantage that these can be moved through the active section in a freely rotating manner.

According to the embodiment according to FIG. 7, the active device 10.7 is arranged in the holding-back region of a holding-back station 45. The holding-back station 45 includes a movable holding-back element which, if required, can hold back, i.e. accumulate the conveyed items 30 that are conveyed on the conveying member 2.1. The roller bodies 14.5 then in the active section SW ensure that the piece items 30 that lie on the contact surfaces 13.6 of the roller bodies 14.5 are rollingly supported, while the conveying member 2.1 moves further at the conveying speed.

No sliding friction occurs between the conveying surface A and the piece item 30 but only the much lower rolling friction between the roller bodies 14.5 and the piece item 30, thanks to the rolling mounting.

Figure 8:
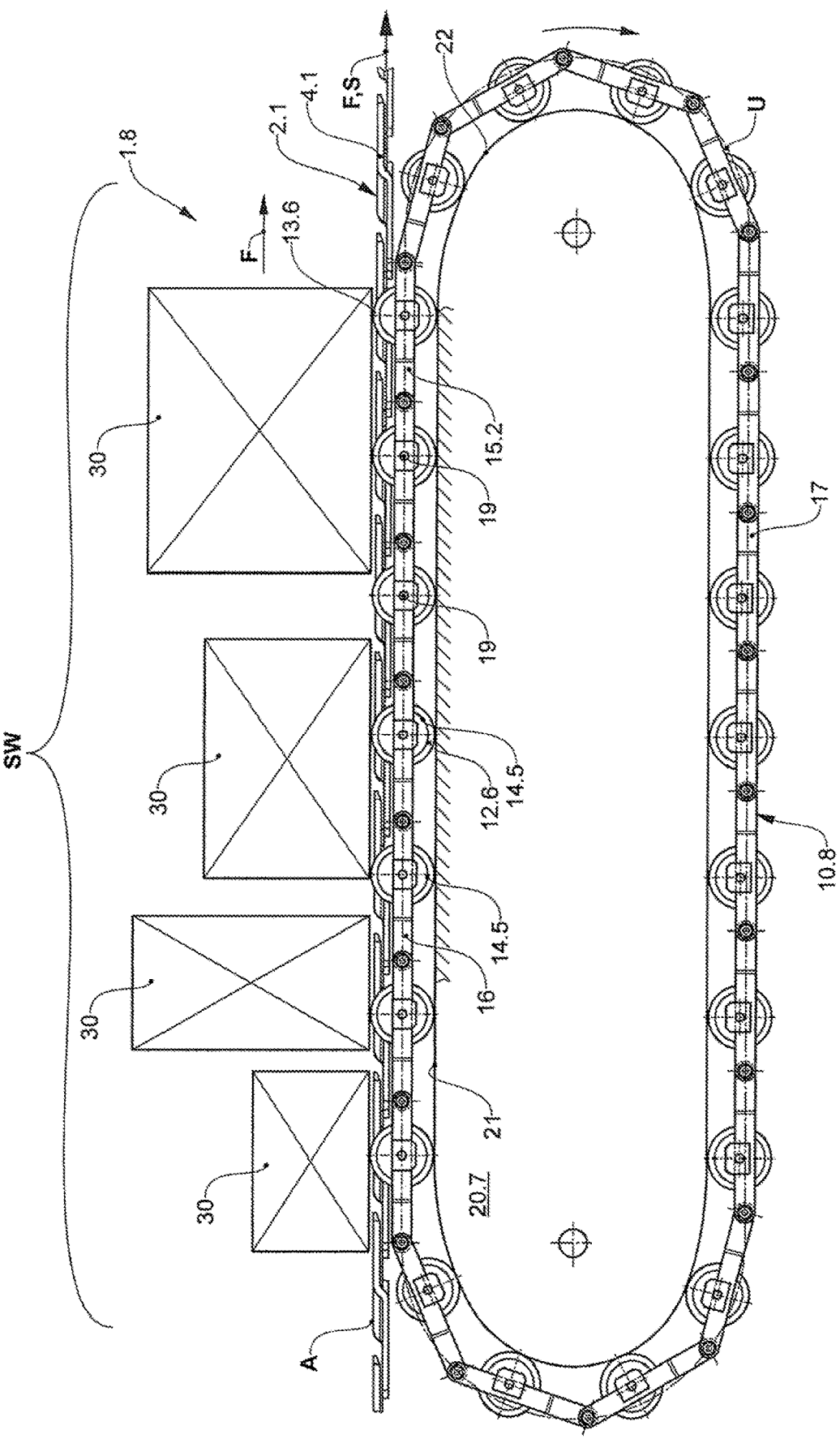
FIG. 8 a lateral view of an eighth embodiment of a conveying appliance with an active device according to the invention in a singularisation zone.

The eighth embodiment according to FIG. 8 basically shows an active device 10.8 of the same type as has already been described concerning the embodiment example according to FIG. 7. The active device 10.8 differs from that in FIG. 7 merely in the design of the support means 20.7. According to the present embodiment, the roller bodies 14.5 peripherally roll directly on a support body 23 that forms the support surface 21.

Figure 9A:
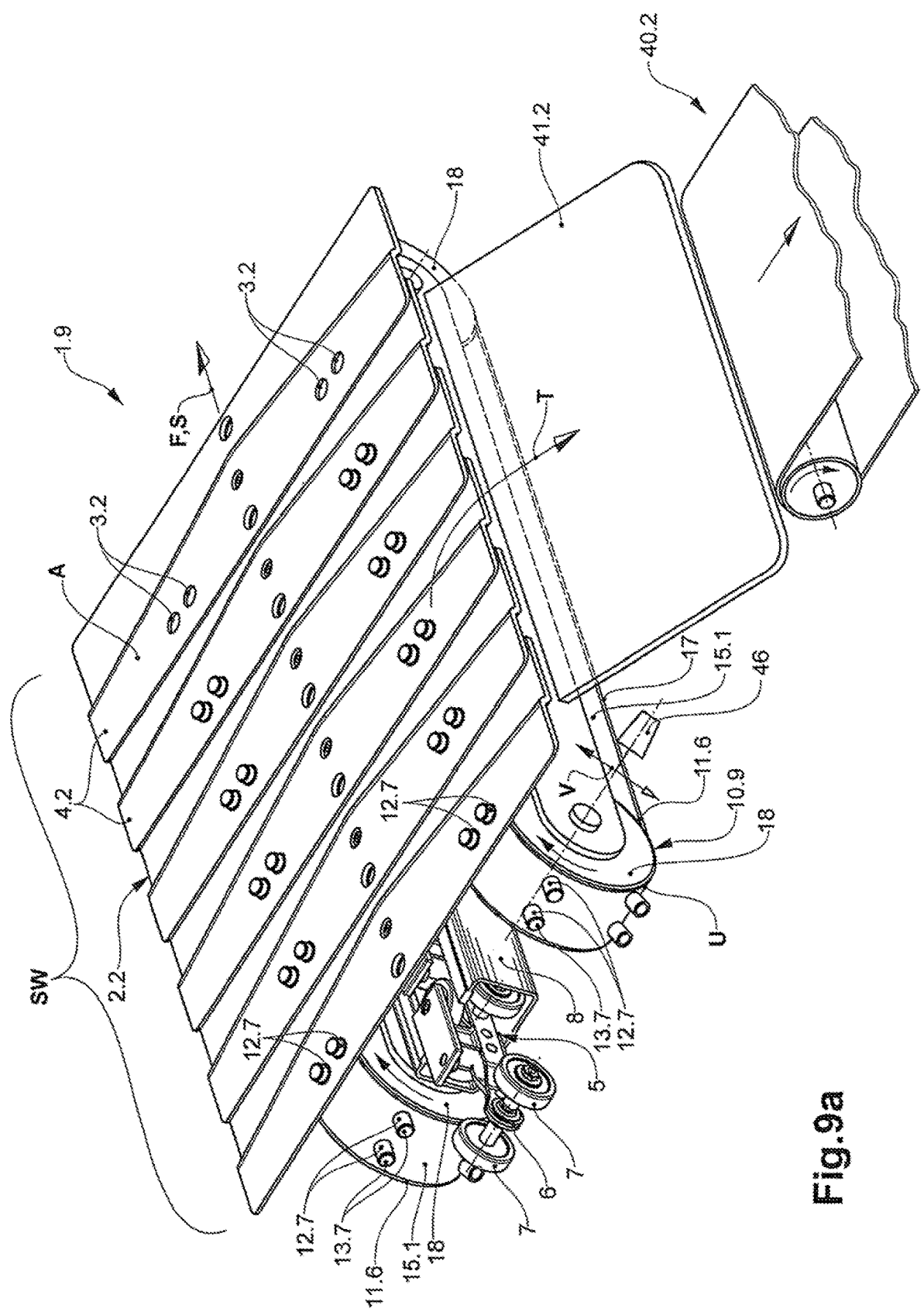
FIG. 9a obliquely from above, a perspective view of a ninth embodiment of a conveying appliance with an active device according to the invention in a transfer zone.

According to the ninth and tenth embodiment according to FIGS. 9a and 9b, the active device 10.9 is arranged at a transfer station 40.2 that forms a transfer zone. In contrast to the embodiment according to FIG. 2b, this transfer station 40.2 has no slider. The piece item is accordingly also not actively pushed from the conveying member 2.2.

In contrast, according to the two present embodiments, the conveying surface A in the transfer zone is inclined to the side transversely to the conveying direction F. The active section SW of the active device 10.9 is formed in the region of this inclination.

A slip element 41.2, via which the piece items can slip away from the conveyed item rest, is arranged at that side of the conveying surface A that lies more deeply.

The two embodiments according to FIGS. 9a and 9b further have the particularity of two active elements 12.7 being arranged next to one another, thus in pairs, on the holding bodies 15.1. Accordingly, the plate elements 4.2 also include two rows that are spaced from one another, each with two through-openings 3.2 that are arranged next to one another. However, this special arrangement is not a necessary feature of the two present embodiments.

According to the embodiment according to FIG. 9a, the active elements are designed as nubs 12.7. The contact surfaces 13.7 of the nubs 12.7 herein have a greater coefficient of friction than the conveying surface A.

If now, in the active region SW, the nubs 12.7 engage through the through-openings 3, then a piece item that lies on the nubs 12.7 is conveyed through the transfer zone in a manner lying on the conveying member 2.2 despite an inclined rest surface due to the high static friction.

If a piece item is now to be ejected, then the active device 10.9 is lowered in a lowering direction V via a lowering and lifting mechanism 46 in a manner such that the nubs 12.7 no longer project through the through openings 3.2 to above the conveying surface A in the active section SW.

The piece item that is to be ejected, in the transfer zone now lies on the conveying surface A of the conveying member 2.2 with a lower static friction. As a result, the piece item slips over the slip element 41.2 away from the inclined conveying surface A by way of the assistance of gravity and is transferred to an outward conveying appliance.

According to the embodiment according to FIG. 9b, the active elements include freely rotating roller bodies 12.7. The conveying item rest that is formed by the contact surfaces 13.7 of the roller bodies 12.7 accordingly has a lower friction resistance with respect to a piece item that lies on this.

The conveying surface A now has a frictional resistance, in particular static friction, that is so high that a piece item that lies on the conveying surface A is conveyed through the transfer zone in a manner lying on the conveying member 2.2 despite the inclined conveying rest, due to the high friction resistance.

If now a piece item is to be ejected, then the active device 10.9 is lifted in a lifting direction V via a lowering and lifting mechanism 46 in a manner such that the roller bodies 12.7 engage through the through-openings 3.2 in the active section SW and protrude to above the conveying surface A.

The piece item that is to be ejected now lies on the roller bodies 12.7 in the transfer zone. Consequently, the piece item, by way of gravitational assistance, moves over the roller bodies 12.7 that roll below this piece item, from the inclined conveying surface A onto a slip element 41.2 b. The piece item slips away over the slip element 41.2 ab and is transferred to an outgoing conveying appliance.

The lowering and lifting mechanism 46 according to the FIGS. 9a and 9b is controlled via a control device in a manner such that piece items can be ejected in a targeted manner via the control device.

Basically, the conveying appliance 1.2, 1.9 according to the embodiments according to FIGS. 2b, 9a and 9b can include a plurality of transfer stations 40.1, 40.2 with corresponding active devices, said transfer stations being arranged one after the other along the conveying stretch S.

Figure 10A:
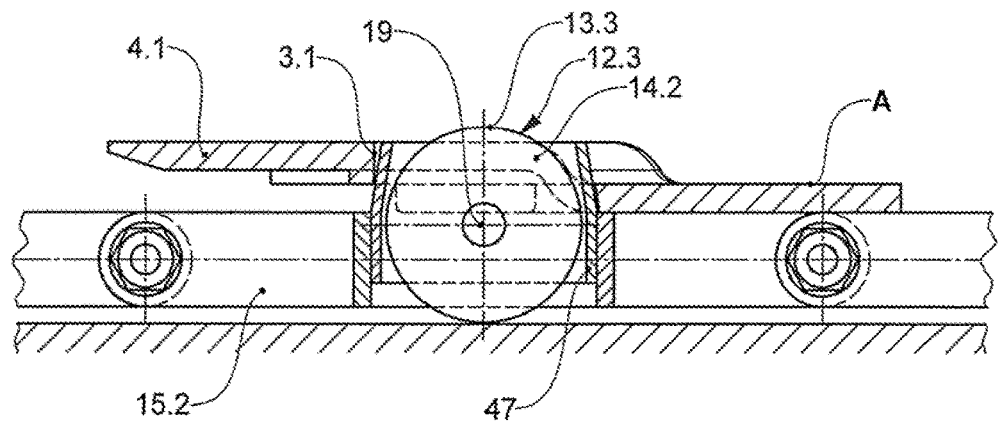
FIG. 10a a lateral view of an embodiment of a holding body according to the invention, with an active element.
Figure 10B:
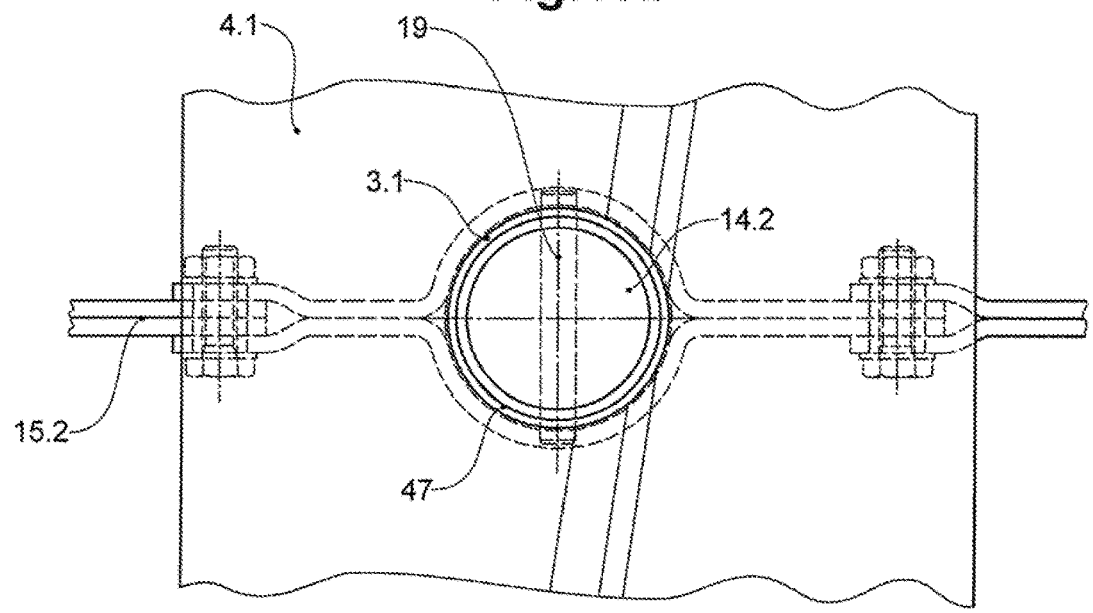
Figure 10C:
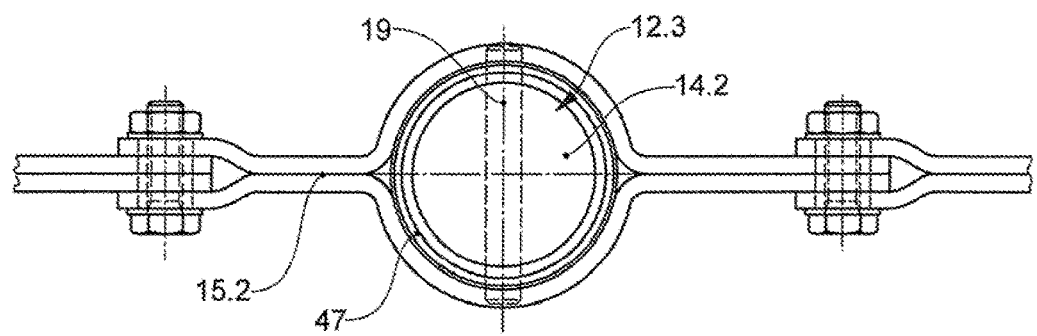
FIG. 10c a plan view of the holding body with an active element according to FIGS. 10a and 10b.

FIGS. 10a-10c show detailed views of the holding body 15.2 with roller bodies 14.2 according to the embodiment according to FIG. 3.

The chain that forms the holding body 15.2 consists of a plurality of chain links that are articulately connected to one another. A chain link each forms a receiver for a roller body 14.2 that is pivot-mounted. The associated rotation pivot 19 is accordingly fastened to the chain link and leads transversely through the receiver. The roller body 14.2 is encompassed in the receiver by a guide sleeve 47 that is open to the top. In particular, the guide sleeve 47 serves for a simpler introduction of the rolling body 14.2 into the through-opening 31 in the plate element 4.1.

The invention claimed is:

1. A conveying appliance with a conveying member that is movable along a conveying stretch and forms a conveying surface for an item that is to be conveyed, wherein the conveying surface of the conveying member comprises openings, said conveying appliance comprising:
    an active device which is arranged below the conveying member, the active device comprising at least one active element that is movable along a closed circulating path, wherein the circulating path in an active section of the conveying stretch forms an actively effective path section that runs parallel to the conveying member, and the active device interacts with the conveying member in the active section such that the at least one active element, along the actively effective path section, projects through one of the openings in the conveying surface and projects beyond the conveying surface, such that the at least one active element is capable of mechanically acting upon a conveyed item, which lies on the conveying surface, wherein the at least one active element is liftable and lowerable relative to the conveying surface in the active section by way of a lowering and lifting mechanism.

2. The conveying appliance according to claim 1, wherein the active device comprises several of the active elements in the actively effective path section, wherein said several of the active elements are arranged successively along the conveying direction and/or next to one another transversely to the conveying direction.

3. The conveying appliance according to claim 1, wherein the at least one active element is designed for lifting the conveyed item in the active section at least partly from the conveying surface and the at least one active element forms a contact surface to the conveyed item in the active section, and the contact surface serves as a conveyed item rest.

4. The conveying appliance according to claim 1, wherein the openings are each completely encompassed by the conveying surface, which is formed by the conveying member.

5. The conveying appliance according to claim 1, wherein the openings are holes.

6. The conveying appliance according to claim 1, wherein the at least one active element is designed to at least partly lift the conveyed item from the conveying surface in the active section.

7. The conveying appliance according to claim 1, wherein the at least one active element comprises a rotatably mounted roller body.

8. The conveying appliance according to claim 7, wherein the roller body is pivot-mounted.

9. The conveying appliance according to claim 1, wherein the conveying surface has an inclination with respect to a horizontal in the active section.

10. The conveying appliance according to claim 1, wherein the at least one active element is designed tapering towards a free end.

11. The conveying appliance according to claim 1, wherein in the active section, the at least one active element comprises a contact surface to the conveyed item, and the contact surface has a higher coefficient of friction with regard to the sliding friction and/or static friction than the conveying surface of the conveying member.

12. The conveying appliance according to claim 1, wherein the conveying member comprises a plurality of rest elements that are linked to one another and form the conveying surface, and the openings are arranged in the rest elements.

13. The conveying appliance according to claim 1, wherein the conveying member comprises a chain and the chain is movable along a guide rail in a rolling and/or sliding manner.

14. The conveying appliance according to claim 1, wherein the conveying member comprises a belt, which is rollingly and/or slidingly movable along the active section.

15. The conveying appliance according to claim 1, wherein the conveying member comprises a modular belt, which is rollingly and/or slidingly movable along the active section.

16. The conveying appliance according to claim 1, wherein the active device comprises at least one active unit, comprising a flexible holding body that is led in a continuously circulating manner and on which the at least one active element is arranged.

17. The conveying appliance according to claim 16, wherein the active device comprises at least two of the active units, which are arranged next to one another transversely to the conveying direction.

18. The conveying appliance according to claim 16, wherein the holding body is a chain, a toothed belt or a belt.

19. The conveying appliance according to claim 1, wherein the active device comprises a support, which forms a support surface, via which the at least one active element is supported to the bottom in a direct or indirect manner in the actively effective path section.

20. The conveying appliance according to claim 19, wherein the at least one active element comprises a rotatably mounted roller body and the roller body is rollingly supported on the support in the actively effective path section.

21. The conveying appliance according to claim 19, wherein the support comprises a contact member that, in the actively effective path section, is movable in the conveying direction and/or counter to the conveying direction and forms the support surface for the at least one active element.

22. The conveying appliance according to claim 1, wherein the conveying appliance is designed
as a belt conveyor and the conveying member as a conveying belt, or
as a plate chain conveyor and the conveying member as a plate chain, or
as a mat chain conveyor and the conveying member as a mat chain, or
as a modular belt conveyor and the conveying member as a modular belt.

23. A method for mechanically influencing a conveyed item that lies on a conveying surface of a conveying member, said conveying member being moved in a conveying direction,
comprising the steps of:
providing a conveying appliance according to claim 1;
lifting the at least one active element in an actively effective manner through the opening to above the conveying surface by way of the lowering and lifting mechanism;
mechanically influencing the conveyed item in the active section by way of forming an active contact between the conveyed item and the at least one active element that projects to above the conveying surface;
ending the mechanical influencing of the conveyed item; and,
moving the at least one active element out of the opening at the end of the active section, and wherein the at least one active element for mechanical non-influencing of a piece item in the active section is lowered to below the conveying surface by way of the lowering and lifting mechanism.

24. The method according to claim 23, wherein the mechanical influencing corresponds to an at least partial lifting of the conveyed item from the conveying surface and the ending of the mechanical influencing corresponds to a lowering of the conveyed item onto the conveying surface.

25. The method according to claim 23, wherein the at least one active element and the conveying member or the openings are moved through the active section at the same speed.

26. The conveying appliance according to claim 16, wherein the active unit is driven by way of the conveying member.

27. The method according to claim 23, wherein a support acts as an actuating means, by way of which the at least one active element is moved through an opening the opening into an actively effective position in the actively effective path section.

28. The method according to claim 23, wherein the at least one active element comprises a roller body, which is supported on a support surface of an actuating means.

29. The method according to claim 28, wherein the actuating means comprises a contact member that is driven in the conveying direction or in a direction opposite to the conveying direction such that the conveyed item, which lies on the at least one roller body, in the active section is moved more quickly or more slowly in the conveying direction than the conveying member or does not move along the conveying stretch or moves counter to the conveying direction.

30. The method according to claim 23, wherein the conveyed item comprises piece items, and a processing step is selectively carried out on individual piece items, wherein the processing step is initiated or carried out by the mechanical influencing of the conveyed item by way of the at least one active element, or by way of the mechanical non-influencing of the conveyed item by way of the at least one active element.

31. The method according to claim 23, wherein the conveying surface of the conveying member is inclined transversely to the conveying direction in the active section, and the at least one active element, for ejecting or transferring the piece item by way of slipping from a conveyed item rest, is lowered in the active section to below the conveying surface by way of the lowering and lifting mechanism and for onwardly conveying the piece item on the conveying member along the active section is actively effectively lifted through the opening to above the conveying surface by way of the lowering and lifting mechanism.

32. The method according to claim 23, wherein the conveying surface of the conveying member is inclined transversely to the conveying direction in the active section, and for ejecting or transferring the piece item by way of sliding away from a conveyed item rest, the at least one active element is actively effectively lifted in the active section through the opening to above the conveying surface by way of the lowering and lifting mechanism and for the onward conveying of the piece item on the conveying member along the active section is lowered to below the conveying surface by way of the lowering and lifting mechanism.

* * * * *